(12) United States Patent  
Bargagni

(10) Patent No.: US 10,565,074 B2  
(45) Date of Patent: Feb. 18, 2020

(54) SYSTEMS AND METHODS TO DISTRIBUTE COMPUTING TASKS AMONG MULTIPLE COMPUTERS

(71) Applicant: Cynny Space SRL, Florence (IT)

(72) Inventor: Stefano Bargagni, Constanta (RO)

(73) Assignee: CYNNY SPACE SRL, Florence (IT)

( * ) Notice: Subject to any disclaimer, the term of this patent is extended or adjusted under 35 U.S.C. 154(b) by 180 days.

(21) Appl. No.: 14/691,301

(22) Filed: Apr. 20, 2015

(65) Prior Publication Data

US 2016/0065493 A1 Mar. 3, 2016

Related U.S. Application Data

(60) Provisional application No. 62/044,140, filed on Aug. 29, 2014.

(51) Int. Cl.
*G06F 11/20* (2006.01)
*H04L 29/08* (2006.01)
(Continued)

(52) U.S. Cl.
CPC ........ *G06F 11/2094* (2013.01); *G06F 9/5061* (2013.01); *G06F 11/14* (2013.01);
(Continued)

(58) Field of Classification Search
CPC ... G06F 11/2094; H04L 67/10; H04L 67/1097
(Continued)

(56) References Cited

U.S. PATENT DOCUMENTS 6,470,389 B1 10/2002 Chung
7,974,415 B2 * 7/2011 Nochta ................ H04L 9/0891
380/273

(Continued)

FOREIGN PATENT DOCUMENTS

CN 102984280 3/2013
CN 103297547 9/2013
(Continued)

OTHER PUBLICATIONS

The International Bureau of WIPO, International Preliminary Report on Patentability, in application No. PCT/US2015/040590, dated Mar. 15, 2017, 9 pages.

(Continued)

*Primary Examiner* — Edward Kim
(74) *Attorney, Agent, or Firm* — Hickman Palermo Becker Bingham LLP

(57) ABSTRACT

A computing device configured to identify portions of a computing job that are assigned to the computing device, if any, based on identification information of the computing job and identifiers of a list of computing devices present in a computing network to process the computing job. The portions are identified by the computing device independent of other computing devices in the computing network. For example, the identification information of the computing job can be mapped by the computing device to a set of identifiers of computing devices based on a predetermined computing function. Each of the identifiers corresponds to a predetermined portion of the computing job. If one of identifiers corresponds to the identifier of the computing device, the computer device performs the predetermined portion of the computing job associated with the mapped identifier.

2 Claims, 15 Drawing Sheets

(51) Int. Cl.
  *G06F 9/50* (2006.01)
  *G06F 11/14* (2006.01)
  *H04L 12/911* (2013.01)
(52) U.S. Cl.
  CPC ............ *H04L 47/783* (2013.01); *H04L 67/06* (2013.01); *H04L 67/10* (2013.01); *H04L 67/104* (2013.01); *H04L 67/1097* (2013.01); *H04L 67/26* (2013.01); *G06F 2201/805* (2013.01)
(58) Field of Classification Search
  USPC ................ 709/201, 202, 213, 214, 215, 216
  See application file for complete search history.

(56) References Cited

U.S. PATENT DOCUMENTS

| | | | | |
|---|---|---|---|---|
| 8,290,919 | B1* | 10/2012 | Kelly | G06F 16/1827 707/698 |
| 8,316,213 | B1* | 11/2012 | Sorenson, III | H04L 67/1097 711/216 |
| 2004/0148326 | A1 | 7/2004 | Nadgir | |
| 2005/0132134 | A1* | 6/2005 | Chien | G06F 3/0607 711/114 |
| 2005/0154869 | A1 | 7/2005 | Shaw et al. | |
| 2005/0257220 | A1 | 11/2005 | McKee | |
| 2006/0031468 | A1 | 2/2006 | Atluri | |
| 2006/0031722 | A1* | 2/2006 | Kolvick | G06F 11/1076 714/52 |
| 2007/0006305 | A1* | 1/2007 | Florencio | H04L 63/14 726/22 |
| 2007/0016726 | A1* | 1/2007 | Zohar | G06F 11/3433 711/114 |
| 2007/0073990 | A1* | 3/2007 | Snaman, Jr. | G06F 11/2094 711/165 |
| 2007/0100854 | A1* | 5/2007 | Lain | G06F 21/64 |
| 2008/0222267 | A1 | 9/2008 | Horn | |
| 2008/0313324 | A1 | 12/2008 | Wong | |
| 2009/0271412 | A1 | 10/2009 | Lacapra | |
| 2010/0106906 | A1 | 4/2010 | Galloway | |
| 2011/0055394 | A1 | 3/2011 | Bi | |
| 2011/0246816 | A1* | 10/2011 | Hsieh | G06F 11/2023 714/4.12 |
| 2012/0054280 | A1 | 3/2012 | Shah | |
| 2012/0054543 | A1 | 3/2012 | Dreier | |
| 2012/0131592 | A1 | 5/2012 | Kim et al. | |
| 2012/0179771 | A1* | 7/2012 | Ganti | G06F 11/1425 709/213 |
| 2012/0233305 | A1 | 9/2012 | Yoshikawa | |
| 2012/0259901 | A1 | 10/2012 | Lee | |
| 2012/0317223 | A1 | 12/2012 | Watanabe | |
| 2012/0331035 | A1 | 12/2012 | Pelletier | |
| 2013/0117606 | A1 | 5/2013 | Anholt | |
| 2013/0346794 | A1 | 12/2013 | Bartlett et al. | |
| 2014/0006597 | A1 | 1/2014 | Ganguli | |
| 2014/0025770 | A1* | 1/2014 | Warfield | G06F 15/17331 709/213 |
| 2014/0115252 | A1* | 4/2014 | Yu | G06F 3/0611 711/113 |
| 2014/0149783 | A1 | 5/2014 | Georgiev | |
| 2014/0157275 | A1 | 6/2014 | Ge et al. | |
| 2014/0164452 | A1 | 6/2014 | Ying | |
| 2014/0214800 | A1* | 7/2014 | Liang | G06F 16/24532 707/718 |
| 2014/0250334 | A1 | 9/2014 | Watanabe | |
| 2014/0304414 | A1 | 10/2014 | Yengalasetti | |
| 2015/0033067 | A1 | 1/2015 | Ludwig | |
| 2015/0172114 | A1 | 6/2015 | Tarlano | |
| 2015/0326438 | A1 | 11/2015 | Mowry | |
| 2016/0004586 | A1 | 1/2016 | Bangole | |
| 2016/0062859 | A1 | 3/2016 | Bargagni | |
| 2016/0065674 | A1 | 3/2016 | Bargagni | |
| 2016/0182623 | A1 | 6/2016 | Waycott | |
| 2017/0177616 | A1 | 6/2017 | Ying | |

FOREIGN PATENT DOCUMENTS

| | | |
|---|---|---|
| KR | 20130133264 | 12/2013 |
| TW | 201234809 | 8/2012 |

OTHER PUBLICATIONS

Current Claims in application No. PCT/US2015/040590, dated Mar. 2017, 12 pages.
Stoica, et al., Chord, A Scalable Peer-to-peer Lookup Service for Internet Applications, 2001.
Bargagni, U.S. Appl. No. 14/691,324, filed Apr. 20, 2015, Office Action, dated Mar. 23, 2017.
Bargagni, U.S. Appl. No. 14/691,316, filed Apr. 20, 2015, Interview Summary, dated Apr. 13, 2017.
International Patent Application Serial No. PCT/US2015/040590, International Search Report and Written Opinion, dated Nov. 2, 2015.
U.S. Appl. No. 14/691,316, filed Apr. 20, 2015, Notice of Allowance, dated Jul. 31, 2017.
Bargagni, U.S. Appl. No. 14/691,324, filed Apr. 20, 2015, Interview Summary, dated Jun. 28, 2017.
Bargagni, U.S. Appl. No. 14/691,324, filed Apr. 20, 2015, Final Office Action, dated Sep. 28, 2017.

* cited by examiner

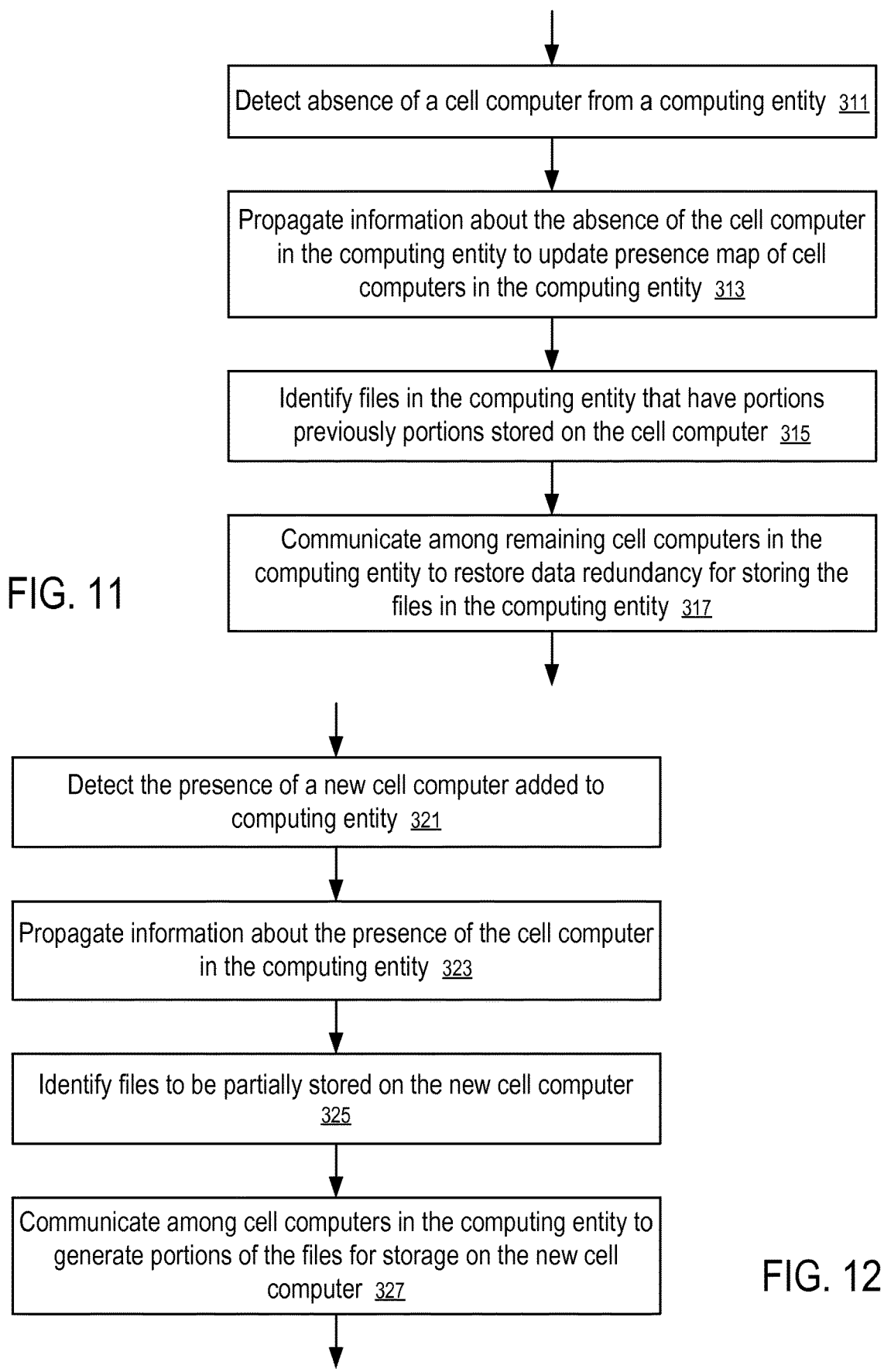

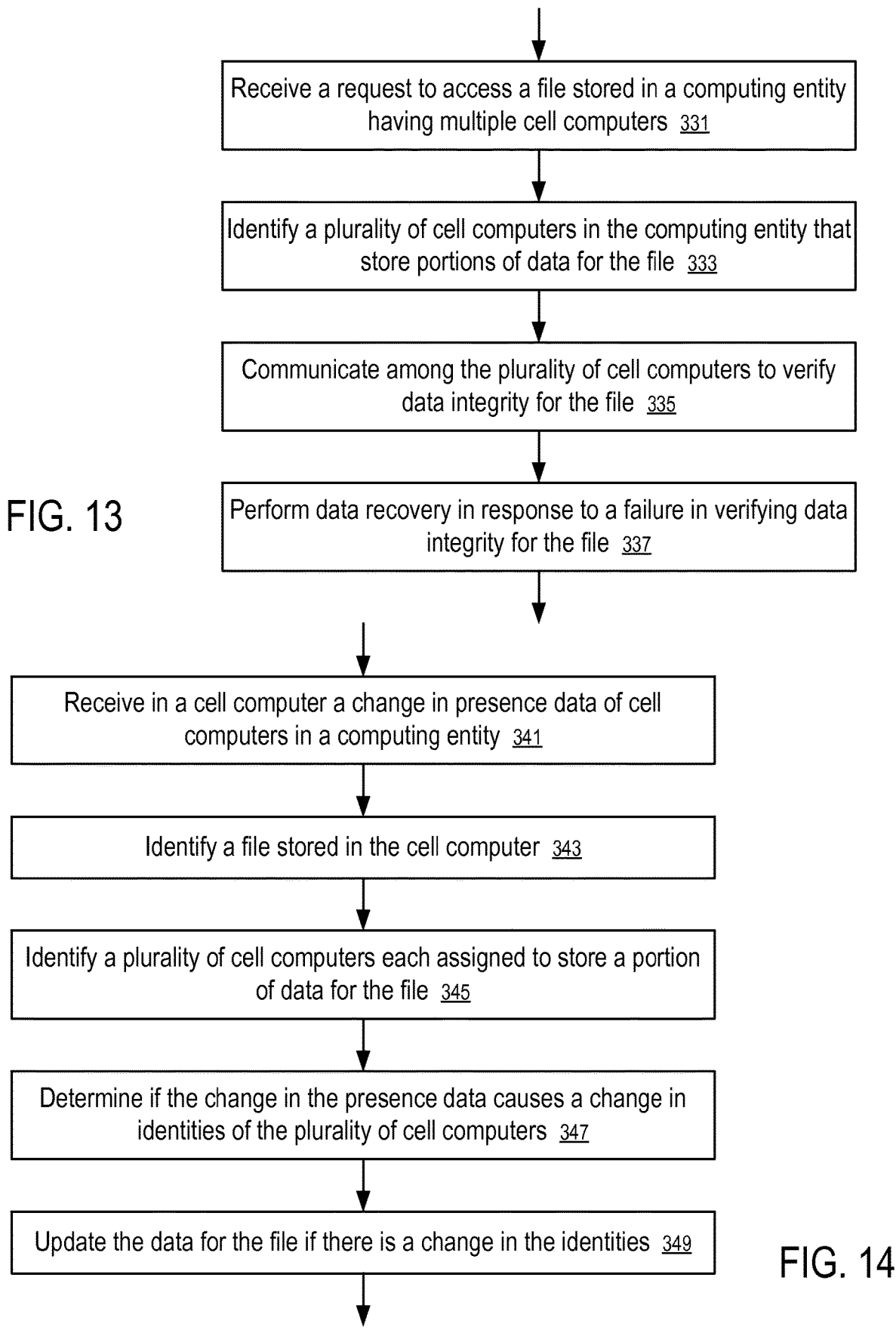

SYSTEMS AND METHODS TO DISTRIBUTE COMPUTING TASKS AMONG MULTIPLE COMPUTERS

RELATED APPLICATIONS

The present application claims priority to Prov. U.S. Pat. App. Ser. No. 62/044,140, filed Aug. 29, 2014 and entitled "Systems and Methods to Configure Data Storage and Processing with Redundancy and Efficiency", the entire disclosure of which is hereby incorporated herein by reference.

FIELD OF THE TECHNOLOGY

At least some embodiments presented in the disclosure relate to distributed computing in general, and more particularly, but not limited to, data storage with redundancy.

BACKGROUND

Present storage network solutions (e.g., enterprise level solutions) are mainly based on the use of servers where a few CPU/Cores control an array of several disks. Redundancy and error-correction policies are implemented based on distributing pieces or chunks of data/information in the disk-array (e.g., redundant array of inexpensive disks or redundant array of independent disks (RAID)). CPUs serve input/output (I/O) requests made in various communication protocols, such as http, ftp, samba, etc.

In such solutions, adding a CPU to speed up the execution of the services is uncommon because the bottle neck is generally on the disk side. Adding a disk to the array requires the reforming of the array. Both operations of adding a CPU and adding a disk may require a temporary stop of the services. Maintenance operations, such as replacing a disk of the array, may also cause a stop or degradation of services.

U.S. Pat. App. Pub. No. 2013/0346794 discloses a system for restoring redundancy in a storage group when a storage device in the storage group fails. Such a system uses dedicated spare parts to increase redundancy and/or correct problems, and any storage location is part of a storage group that uses a dedicated spare part.

KR20130133264 discloses a system in which to implement redundancy where each storage unit is configured to have a corresponding unit to mirror the data being stored.

CN103297547 discloses a method to construct a cloud storage auxiliary system in which data validity in P2P storage is predicted by performing data dynamic modeling using a Markov model, and thus, bandwidth costs due to the fact that data are read by the cloud are effectively reduced.

U.S. Pat. App. Pub. No. 2012/0054280 discloses sharing cloud data resources among associated users.

CN102984280 discloses a social cloud storage network application, which uses a logic master node, a plurality of consistence nodes and a plurality of data nodes.

TW201234809 discloses a method for displaying data objects based on social networks executed by a cloud storage access system.

BRIEF DESCRIPTION OF THE DRAWINGS

FIG. 11 shows a method to process removal of a computer from a computing system having stored files with redundancy according to one embodiment.

FIG. 12 shows a method to process the addition of a computer to a computing system having stored files with redundancy according to one embodiment.

FIG. 13 shows a method to process a request to access a file stored in multiple computers of a computing system according to one embodiment.

FIG. 14 shows a method to process a change in availability of computers in a computing system configured to store files with redundancy according to one embodiment.

DETAILED DESCRIPTION

The disclosure includes technologies that allow the implementation of a storage system for electronic data, which system is virtually and endlessly expandable in terms of performance and space.

In one embodiment, a technology presented herein uses a set of special-purpose software instructions that are configured to be implicitly aware of hardware failures and therefore able to automatically work around the failures and maintain the integrity and reliability of the data stored and of the system as a whole.

In one embodiment, a data storage system is configured as a social cloud, operating as a computing entity that includes multiple cell computers operating as computing cells that are configured to provide parity and availability.

For example, with respect to parity, any cell in the entity of one embodiment can be easily substituted by any other in its role (e.g., based on peer to peer policies), and with respect to availability, data and hardware in the system have redundancies.

Figure 1:
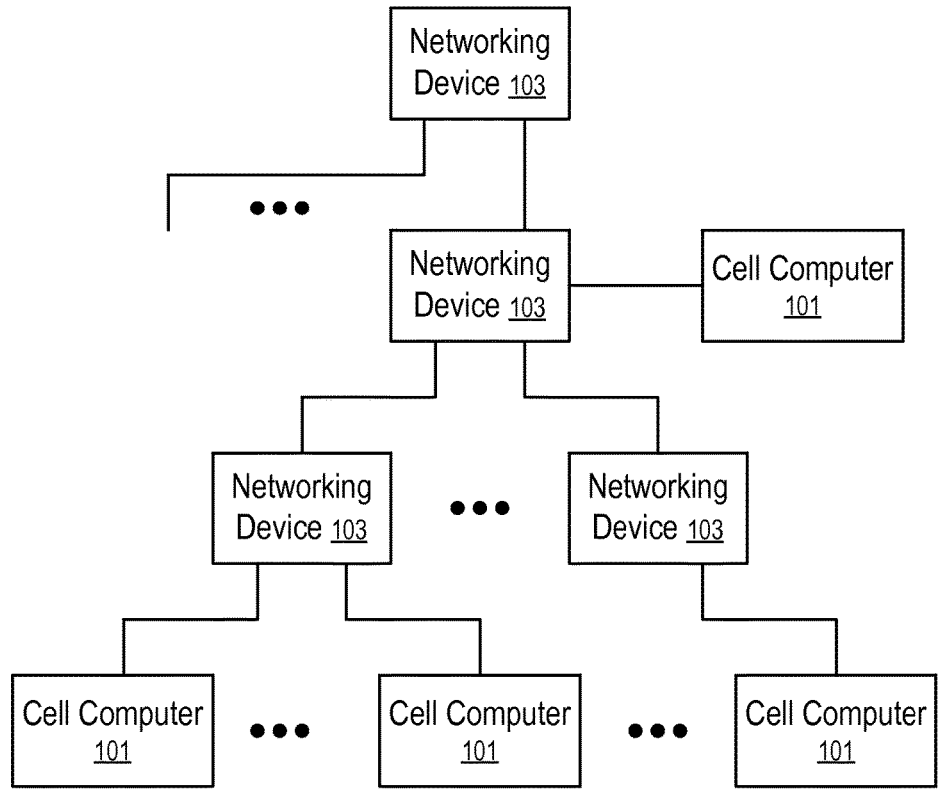
FIG. 1 shows a computer network connecting a plurality of cell computers to form a computing system according to one embodiment.

FIG. 1 shows a computer network connecting a plurality of cell computers to form a computing system according to one embodiment.

In FIG. 1, a set of cell computers (101) are connected to a computer network via a set of networking devices (103), such as network switches, routers, gateways, etc. The cell computers (101) can be initially identically configured in software and/or hardware before the cell computers (101) are connected to the computer network. Upon being connected to the networking devices (103), the cell computers (101) are configured in one embodiment to automatically assign unique identifiers to themselves for computing roles in a computing entity.

For example, in the network connectivity hierarchy of the networking devices (103), each of the cell computers (101) connected to a respective networking device (103) has a unique position. The unique position represented in the network connectivity hierarchy can be mapped to a unique identifier. Thus, if a different cell computer (101) replaces the respective cell computer (101) at the same unique position, the different cell computer (101) is assigned the same unique identifier.

In one embodiment, each of the cell computers (101) is configured to communicate with the network infrastructure to identify its unique position in the network connectivity hierarchy and use a predetermined scheme or function to make the position information available to a unique identifier. Thus, upon being connected to the computer network, each of the cell computers (101) is capable of computing/determining its unique identifier in the computing entity/system based on communications with the network infrastructure.

In one embodiment, each of the cell computers (101) is further configured to automatically determine the identity of the computer entity to which the respective cell computer (101) is to join, based on the characteristics of the computer network to which the respective cell computer (101) is connected.

For example, upon being connected to the computer network, the cell computer (101) is configured to communicate with the network infrastructure to determine a domain name of the computer network and use the domain name as a computer entity identifier, or use the domain name to compute a computer entity identifier. The cell computer (101) is then configured to join the computer entity/system identified by the computer entity identifier. Thus, identically configured cell computers (101) can be simply connected into different computer networks having different domain names to join the respective computing entities corresponding to the domain names.

Figure 2:
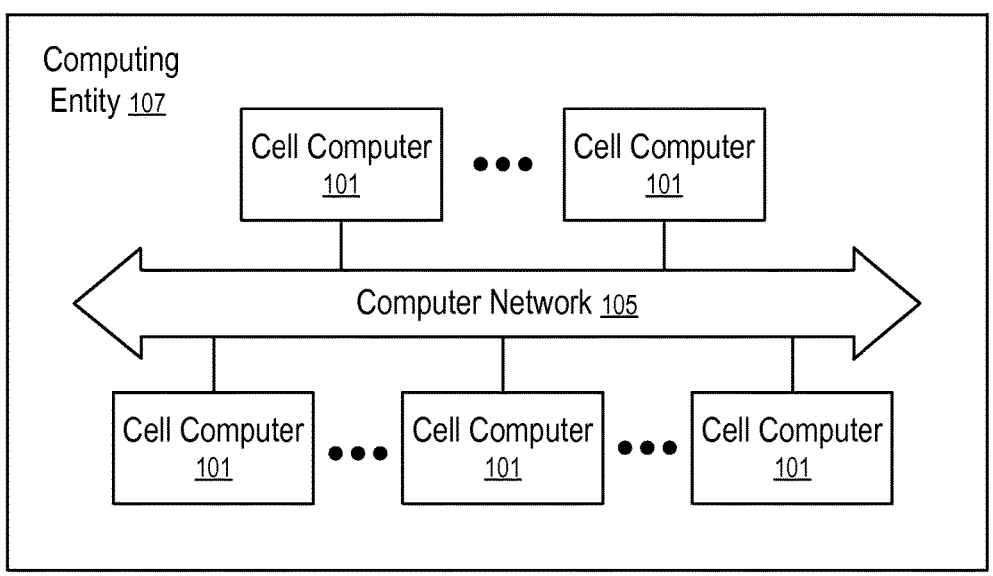
FIG. 2 shows a computing entity formed by a plurality of cell computers over a computer network according to one embodiment.

FIG. 2 shows a computing entity formed by a plurality of cell computers (101) over a computer network according to one embodiment.

In FIG. 2, the computer network (105) includes the networking devices (103) as illustrated in FIG. 1. Each of the cell computers (101) computes a computer entity identifier when the respective cell computer (101) is connected to the computer network (105). Since the computer entity identifier is computed based on the same domain name as the computer network (105), the cell computers (101) join the same computing entity (107).

In one embodiment, each of the cell computers (101) is configured to propagate the presence information of the cell computers (101) within the computing entity (107). For example, when a cell computer (101) is connected to the computer network (105), the cell computer (101) is configured to communicate with the network infrastructure to compute its unique identifier and announce its presence and unique identifier in the computer network (105), such that other cell computers (101) in a network neighborhood of the cell computer (101) become aware of the presence of the cell computer (101) in the computing entity (107).

In one embodiment, each respective cell computer (101) is configured to store the presence data of the cell computers (101) in the computing entity (107), including a list of the unique identifiers of the cell computers (101) the respective cell computer (101) is aware of. For example, if the respective cell computer (101) observes a message in the computer network (105) announcing the presence of a new cell computer (101), the respective cell computer (101) is configured to add the new cell computer (101) to its presence list.

Further, when there is a change in presence data, each respective cell computer (101) may provide a notification message to each cell computer (101) on its presence list to propagate the change. In some embodiments, each of the cell computers (101) waits for a random period of time to push out its notifications about the change.

Thus, in the computing entity (107), each of the cell computers (101) is aware of the availability of the other cell computers (101) in the computing entity (107). Based on the presence data and a predetermined algorithm, each of the cell computers (101) of the computing entity (107) can identify/assign its own share of computing tasks with the computing entity (107) independently from the operation of other cell computers (101).

Figure 3:
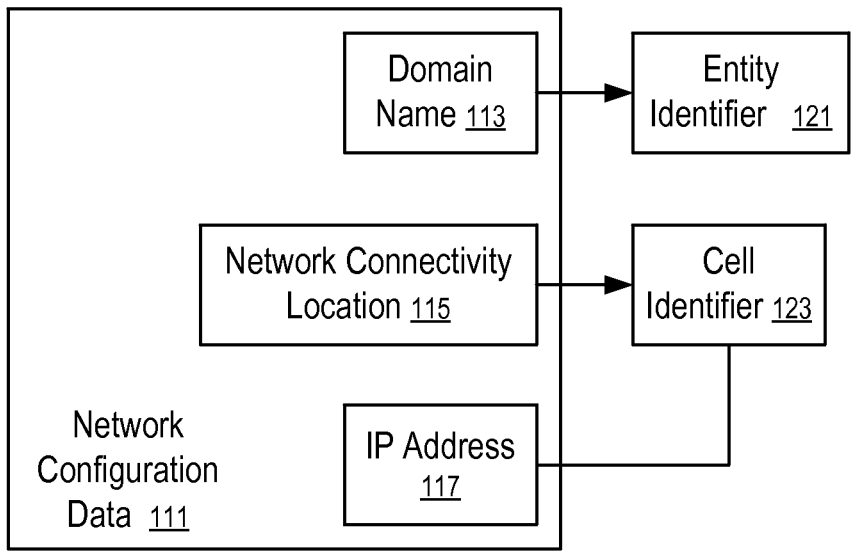
FIG. 3 shows the automation of configuring a cell computer for a computing entity according to one embodiment.

FIG. 3 shows the automation of configuring a cell computer for a computing entity (107) according to one embodiment. In FIG. 3, upon being connected to the computer network (105), each cell computer (101) is configured to communicate with the network infrastructure (e.g., networking devices (103)) to automatically determine its network configuration data, such as the internet protocol (IP) address (117), the domain name (113) of the computer network (105), and the network connectivity location (115) of the cell computer (101) in the connection hierarchy of the networking devices (103).

For example, each of the networking devices (103) has a plurality of ports. Each port of a networking device (103) has a unique identifier. A connection to a port is identified by the unique identifier of the port; and the hierarchy of connections to particular ports from a cell computer (101) to a top-level networking device (103) (e.g., a top-level gateway) represents a unique network connectivity location (115) of the cell computer (101).

In FIG. 3, the unique cell identifier (123) of the cell computer (101) connected at the unique network connectivity location (115) is computed from the unique network connectivity location (115), and the entity identifier (121) of the computing entity (107) to which the cell computer (101) joins is computed from the domain name (113). Thus, based on the network configuration data (111), the cell computer (101) configures itself for a role in the computing entity (107).

In one embodiment, the computing entity (107) is configured to distribute computing tasks for a receive request to a subset of the cell computers (101) in the computing entity (107). In one embodiment, each of the cell computers (101) contains presence information of the other cell computers (101) in the computing entity (107) and applies the same algorithm on the same data, including the presence information, to compute the distribution of the tasks. Thus, for a given computing request received in the computing entity (107), each respective cell computer (101) is capable of determining the identities of cell computers (101) that are assigned to perform pre-determined portions of the tasks for the computing request and identifies and performs the portion that is assigned to the respective cell computer (101). Thus, each respective cell computer (101) is capable of self-assigning a correct portion of computing tasks.

Figure 4:
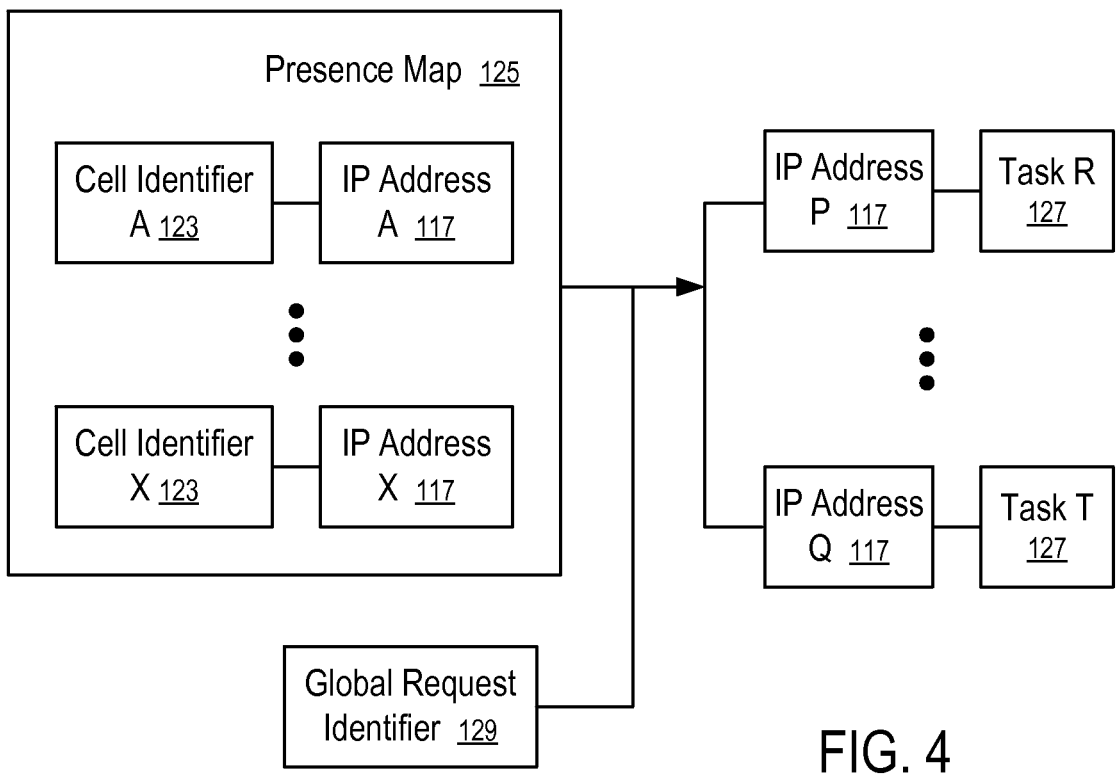
FIG. 4 shows the distribution of computing tasks to a set of cell computers in a computing entity according to one embodiment.

FIG. 4 shows the distribution of computing tasks to a set of cell computers (101) in a computing entity (107) according to one embodiment. In FIG. 4, the presence map (125) includes a mapping between the cell identifiers (123) of the cell computers (101) in the computing entity (107), and the IP addresses (117) (or other types of network addresses) of the cell computers (101) for network communications.

In one embodiment, for a given global request identifier (129), such as a filename of a file to be stored in the computing entity (107), the operations for processing the request are divided into a predetermined number of tasks (127). For example, each of the tasks (127) may correspond to a predetermined portion of data for storing the file with redundancy and/or parity. To assign a subset of the cell computers (101) to the tasks (127), a predetermined algorithm is applied to the presence map (125) and the global request identifier (129) to compute the cell identifiers (123) (and thus their corresponding IP address (117)).

For example, the cell identifiers (123) may be configured as numbers in a predetermined range (e.g., as virtual IP addresses), and a hash function can be applied to the global request identifier (129) to a predetermined range. The hash function may be applied recursively to compute a plurality of cell identifiers (123) that are in the presence map (125). Other methods to select the IP addresses (117) for the corresponding tasks (127) can be used. Thus, the disclosure is not limited to a hash function implementation.

In one embodiment, the selecting of the IP addresses (117) for the respective tasks (127) is based on the global request identifier (129) such that different requests are assigned to different subsets of cell computers (101) for automatic load balancing among the cell computers (101) in the computing entity (107).

In one embodiment, since each of the cell computers (101) in the computing entity (107) maintains the same presence map (125), receives the same global request identifier (129), and uses the same algorithm/function to compute the selected cell identifiers (123) of the IP addresses (117) of cell computers (101) assigned to perform the tasks (127), the cell computers (101) can compute the same results. Therefore, each of the cell computers (101) simply determines if any of the tasks (127) are assigned to themselves, and if so, perform the respective task (127).

Figure 5:
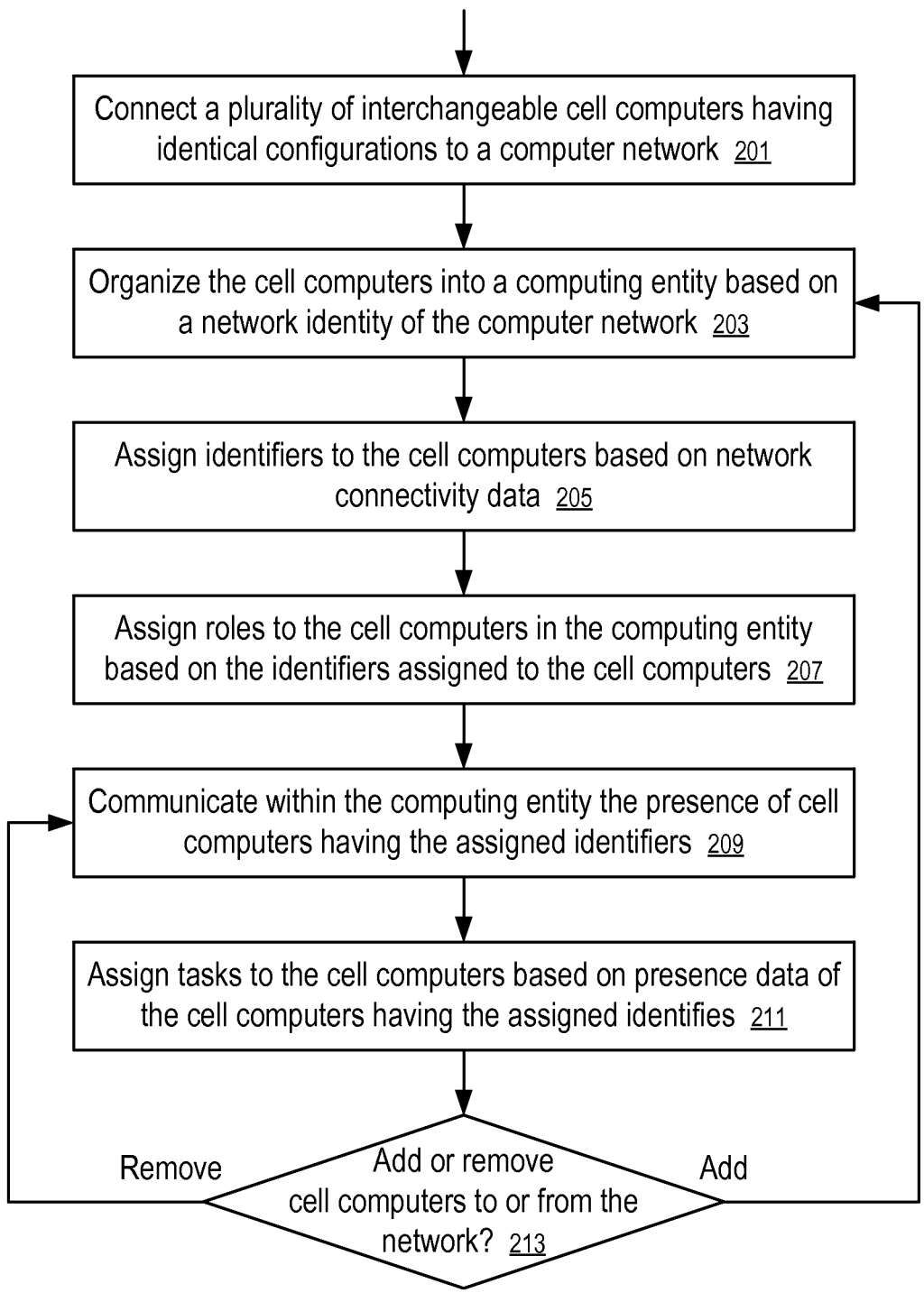
FIG. 5 shows a method to configure a computing system according to one embodiment.

FIG. 5 shows a method to configure a computing system according to one embodiment. In FIG. 5, after a plurality of interchangeable cell computers (101) having identical configurations are connected (201) to a computer network (105) in a way as illustrated in FIGS. 1 and 2, the cell computers (101) are organized (203) into a computing entity (107) based on a network identity of the computer network (105). Since each of the cell computers (101) can obtain the network identity of the computer network (105) independently from each other, each of the cell computers (101) can be configured to compute the entity identifier (121) of the computing entity (107) it joins independent of other cell computers (101).

In FIG. 5, cell identifiers (123) are assigned (205) to the cell computers (101) based on network configuration data (111) (e.g., network connectivity locations (115)). Since each of the cell computers (101) can obtain its network configuration data (111) independently from each other, each of the cell computers (101) can be configured to compute its cell identifier (123) independent of other cell computers (101).

In FIG. 5, roles of the cell computers (101) are assigned (207) to the cell computers (101) in the computing entity (107) based on the cell identifiers (123) assigned to the cell computers (101). Thus, the cell computers (101) can self-assign their roles in the computing entity (107) based on the self-assigned cell identifier (123) and a predetermined role assigning scheme.

In FIG. 5, the cell computers (101) communicate (209) within the computing entity (107) the presence of the cell computers (101) having their respectively assigned cell identifiers (123). Thus, when there are no further changes in presence data to be propagated in the computer network (105), each of the cell computers (101) has the same complete list of cell identifiers (123) of the cell computers (101) in the computing entity (107) and their respective network addresses for communicating with each other.

In FIG. 5, the computing entity (107) is configured to assign (211) computing tasks (127) to the cell computers (101) based on presence data of the cell computers (101) having the assigned cell identifiers (123). Since each of the cell computers (101) has the same complete list of cell identifiers (123) in their presence data, each of the cell computers (101) can identify tasks (127) assigned to themselves independently from other cell computers (101).

In FIG. 5, if (213) a new cell computer (101) is added to the computer network (105), the new cell computer (101) is organized (203) into the computing entity (107) based on the network identity of the computer network (105). If (213) an existing cell computer (101) is removed from the computer network (105), the remaining cell computers (101) in the computing entity (107) communicate (209) with each other to update their presence data.

If an existing cell computer (101) is replaced with a new cell computer (101) at the same network connectivity location (115) (e.g., being connected to the same port of the same networking device (103)), the new cell computer (101) automatically replaces the role of the existing cell computer (101) in the computing entity (107).

Thus, the human involvement in maintaining and configuring a computing entity (107) is reduced and/or minimized via the automation.

Figure 6:
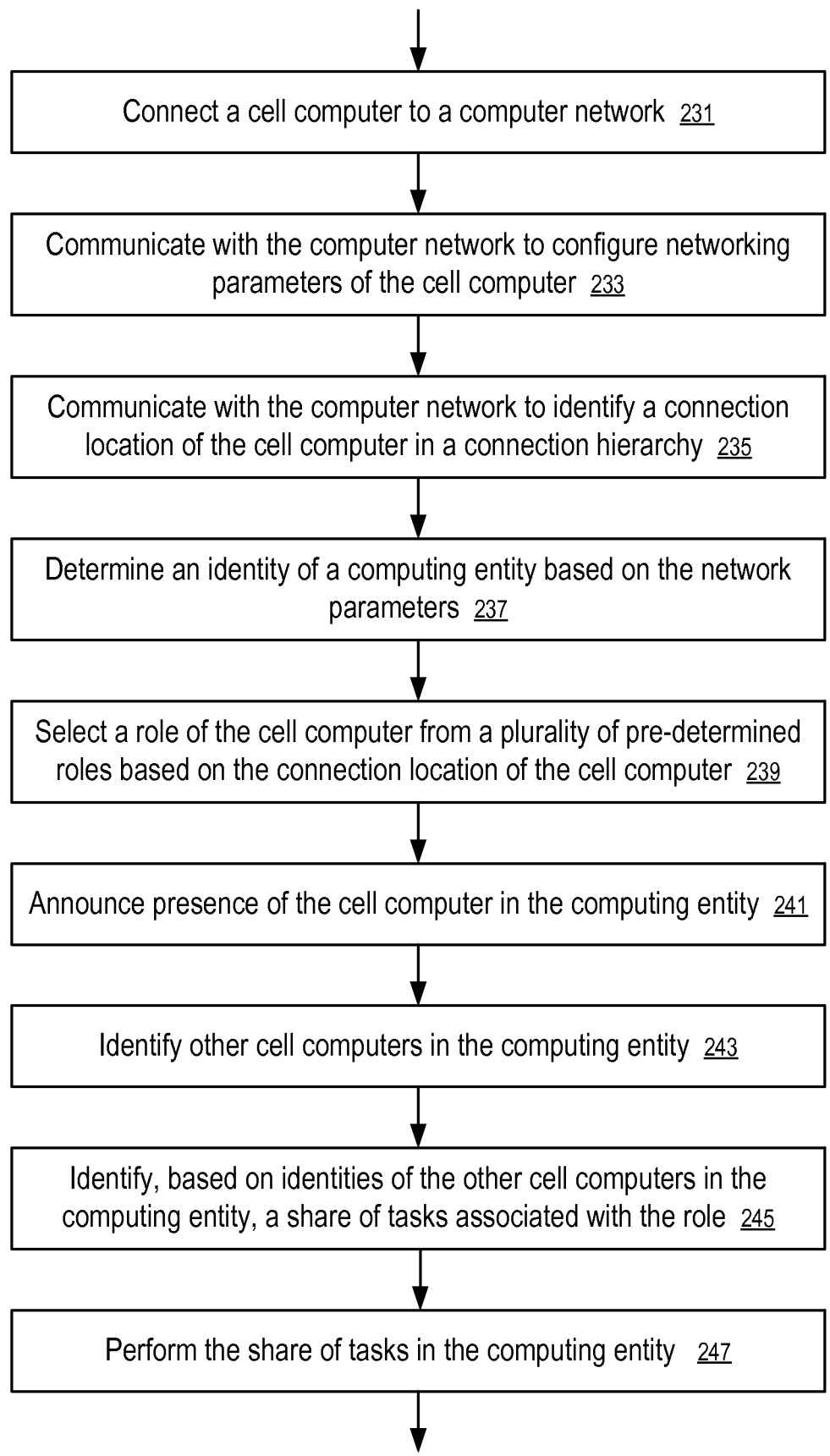
FIG. 6 shows a method to configure a computer added to a computing system according to one embodiment.

FIG. 6 shows a method to configure a computer added to a computing system according to one embodiment.

In FIG. 6, after a cell computer (101) is connected (231) to a computer network (105), the cell computer (101) communicates (233) with the computer network (105) to automatically configure networking parameters of the cell computer (101), such as the IP address (117) from a dynamic host configuration protocol (DHCP) server. The cell computer (101) then automatically communicates (235) with the computer network (105) to identify a network connectivity location (115) of the cell computer (101) in a connection hierarchy (e.g., via LLDP queries). The cell computer (101) determines (237) an entity identifier (121) of a computing entity (107) based on the network parameters, such as a domain name (113) of the computer network (105), and selects (239) a role of the cell computer (101) from a plurality of pre-determined roles based on the network connectivity location (115) of the cell computer (101).

In FIG. 6, the cell computer (101) announces (241) the presence of the cell computer (101) in the computing entity (107); identifies (243) other cell computers (101) in the computing entity (107); identifies (245), based on identities of the other cell computers (101) in the computing entity (107), a share of tasks (127) associated with the role; and performs (247) the share of tasks (127) in the computing entity (107).

Figure 7:
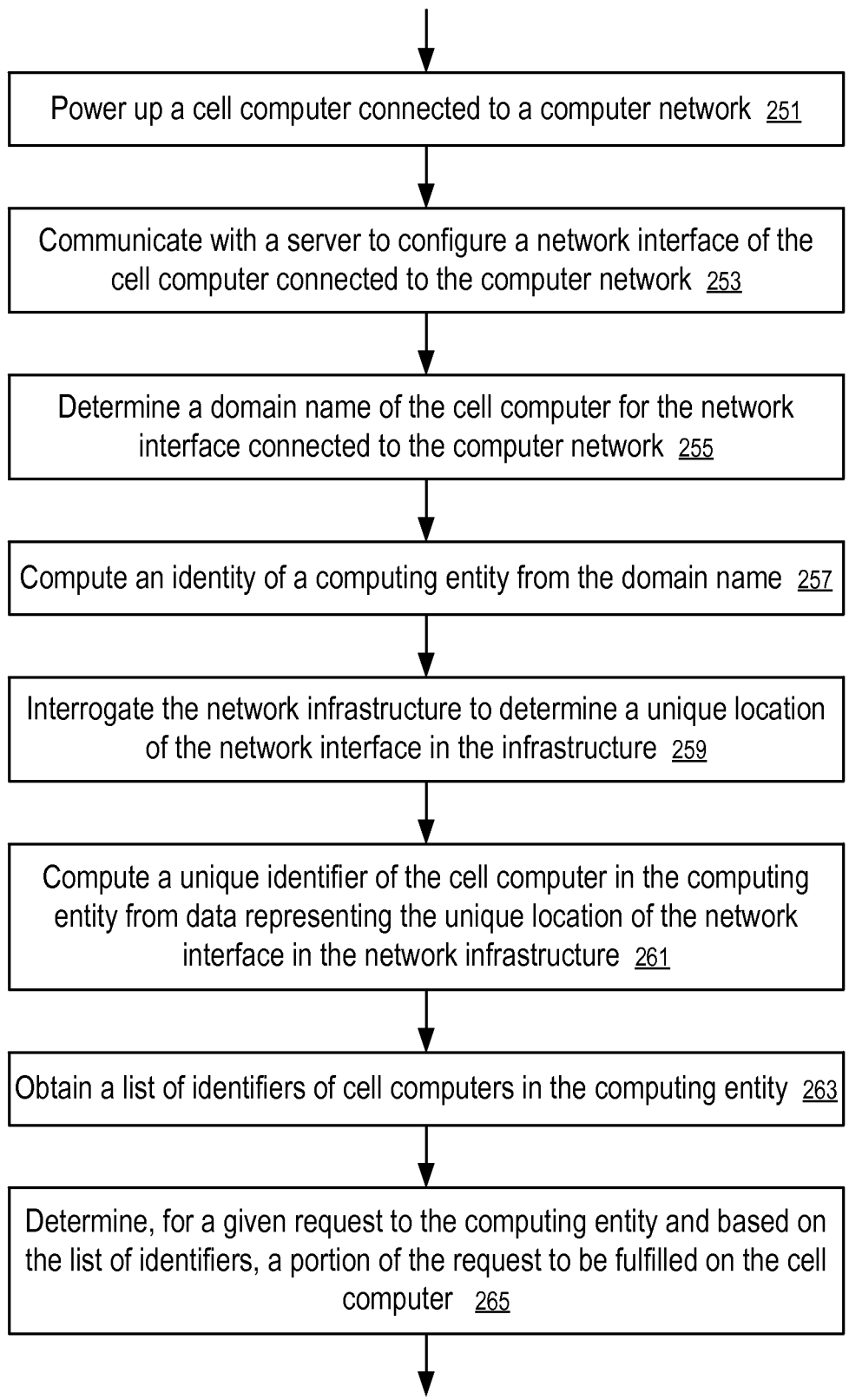
FIG. 7 shows a method to operate a computer in a computing system according to one embodiment.

FIG. 7 shows a method to operate a computer in a computing system according to one embodiment.

In FIG. 7, after powering up (251) a cell computer (101) connected to a computer network (105), the cell computer (101) automatically communicates (253) with a server to configure a network interface of the cell computer (101) connected to the computer network (105). The cell computer (101) determines (255) a domain name (113) of the cell computer (101) for the network interface connected to the computer network (105); computes (257) an entity identifier (121) of a computing entity (107) from the domain name (113); interrogates (259) the network infrastructure (e.g., via LLDP queries) to determine a unique location of the network interface in the infrastructure; and computes (261) a unique cell identifier (123) of the cell computer (101) in the computing entity (107) from data representing the unique location of the network interface in the network infrastructure.

After obtaining (263) a list of cell identifiers (123) of cell computers (101) in the computing entity (107), the cell computer (101) determines (265), for a given request to the computing entity (107) and based on the list of cell identifiers (123) maintained in a presence map (125) on the cell computer (101), a portion of the request to be fulfilled on the cell computer (101).

In one embodiment, the portion of the request to be fulfilled on the cell computer (101) is determined further based on a global request identifier (129) of the given request, such as a name of the file to be stored in the computing entity (107).

In one embodiment, a distributed hash table (DHT) approach is used will be used as a communication protocol between cells to communicate presence and disconnection (e.g., in a way as disclosed by Ion Stoica et al., in "Chord: A scalable Peer-to-peer Lookup Service for Internet Applications", presented in SIGCOMM'01, Aug. 27-31, 2001, San Diego, Calif., USA, and published in IEEE/ACM Transactions on Networking, Vol. 11, Issue 1, Pages 17-32, February 2003).

Figure 8:
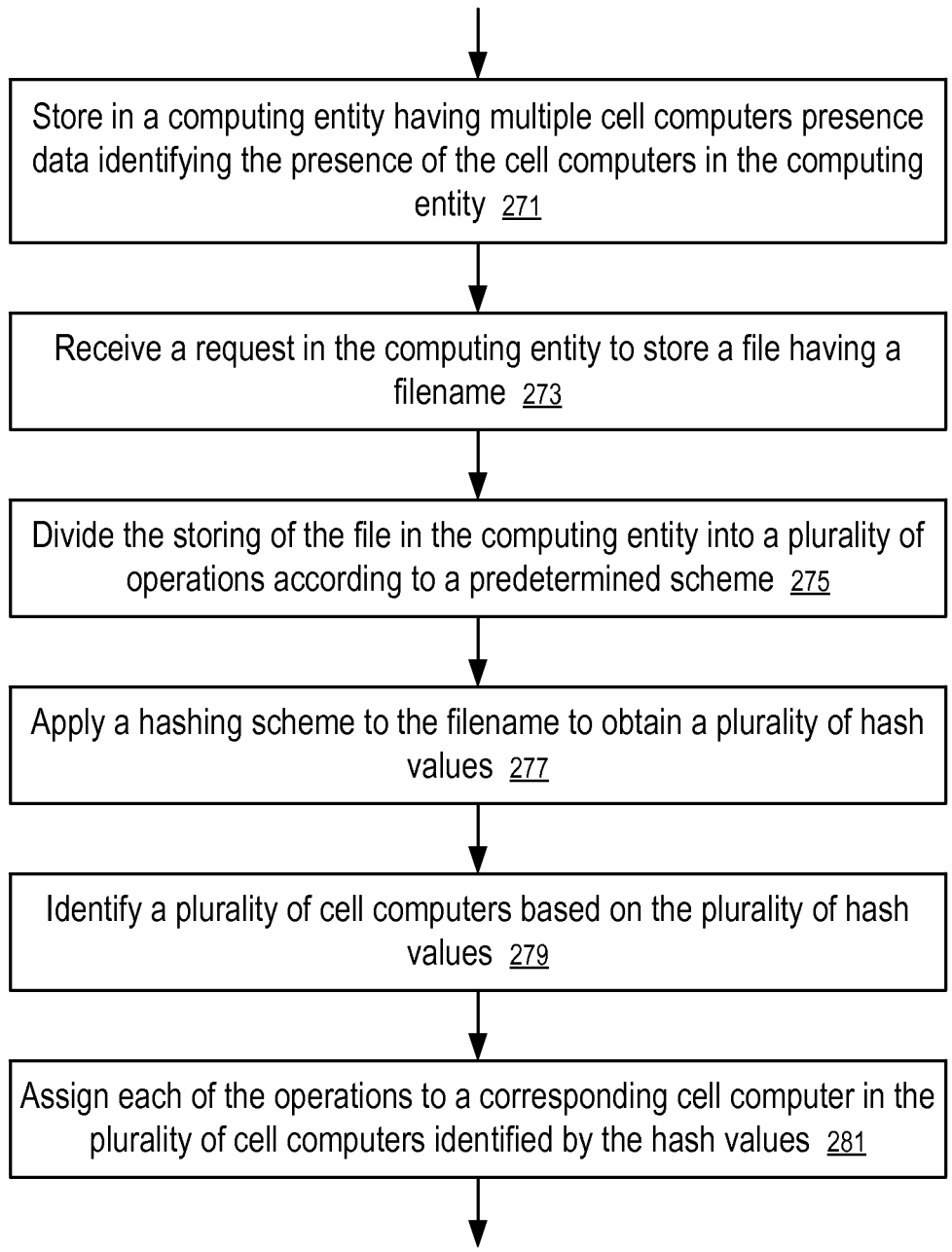
FIG. 8 shows a method to assign computing tasks related to a file to a subset of computers in a computing system according to one embodiment.

FIG. 8 shows a method to assign computing tasks (127) related to a file to a subset of computers in a computing system according to one embodiment.

In FIG. 8, after storing (271) in a computing entity (107) having multiple cell computers (101) presence data (e.g., 125) identifying the presence of the cell computers (101) in the computing entity (107), the computing entity (107) receives (273) a request to store a file having a filename. The storing of the file in the computing entity (107) is divided (275) into a plurality of operations according to a predetermined scheme. To assign the plurality of operations/tasks (127) to multiple cell computers (101), a hashing scheme is applied (277) to the filename to obtain a plurality of hash values used to identify (279) a plurality of cell computers (101).

In one embodiment, the cell computers (101) in the computing entity (107) are configured to compute the hash values to identify (279) the plurality of cell computers (101) in parallel and determine if they are assigned to perform any and/or which of the operations.

Thus, each corresponding cell computer (101) in the plurality of cell computers (101) identified by the hash values self-assign (281) a respective operation.

Figure 9:
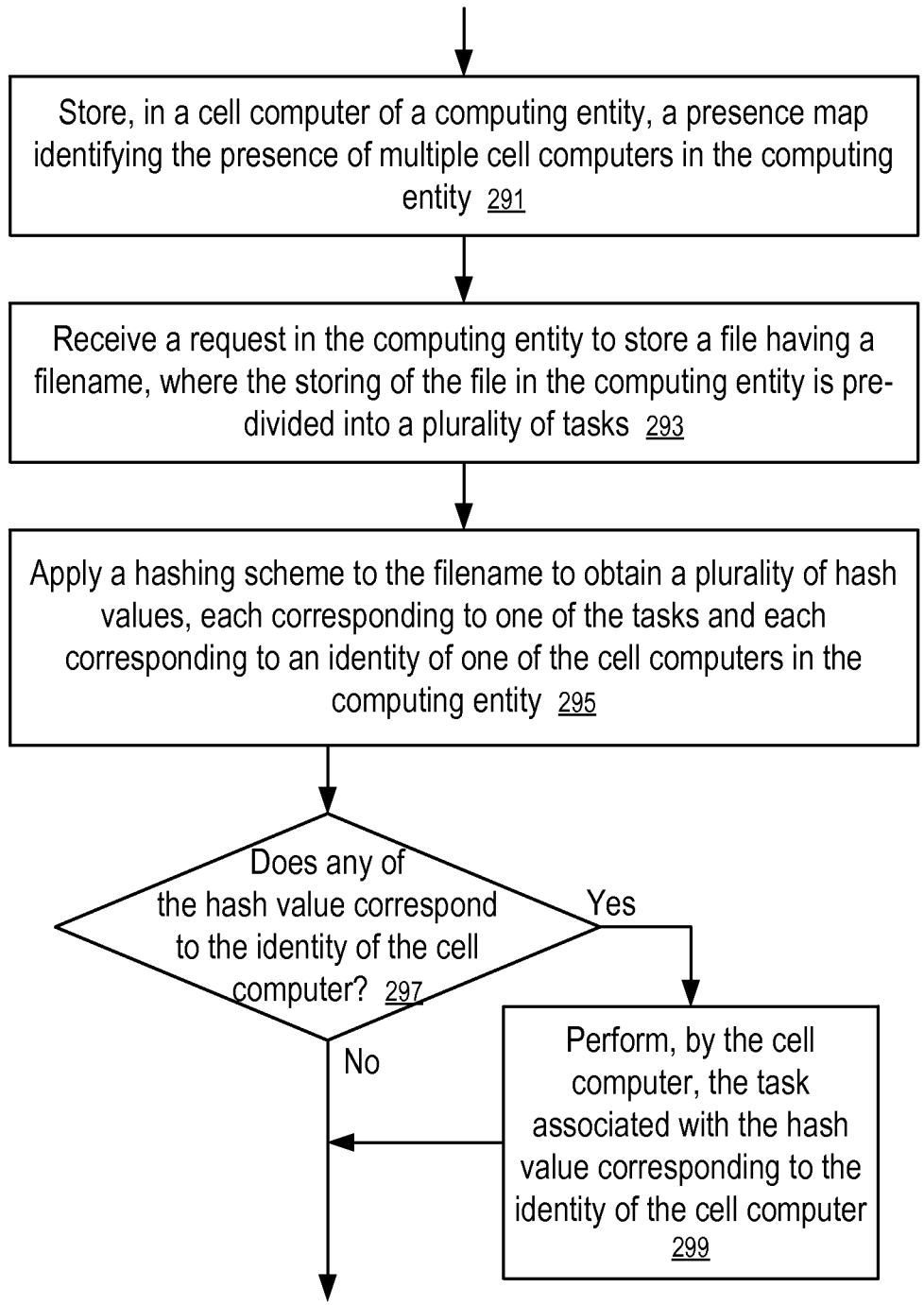
FIG. 9 shows an example to assign computing tasks related to a file to a subset of computers in a computing system according to one embodiment.

FIG. 9 shows an example to assign computing tasks (127) related to a file to a subset of computers in a computing system according to one embodiment.

In FIG. 9, after a presence map (125) identifying the presence of multiple cell computers (101) in the computing entity (107) is stored (291) in a cell computer (101) of a computing entity (107), the cell computer (101) receives (293) a request in the computing entity (107) to store a file having a filename, where the storing of the file in the computing entity (107) is pre-divided into a plurality of tasks (127), such as saving meta data of the file, saving a copy or a portion of the file, computing parity data for redundancy, saving the parity data, etc.

In FIG. 9, the cell computer (101) applies (295) a hashing scheme to the filename to obtain a plurality of hash values, each corresponding to one of the tasks (127) and each corresponding to an entity of one of the cell computers (101) in the computing entity (107).

The cell computer (101) determines (297) whether any of the hash values correspond to the identity of the cell computer (101) itself, and if so, performs (299) the task (127) associated with the hash value corresponding to the identity of the cell computer (101) itself.

Figure 10:
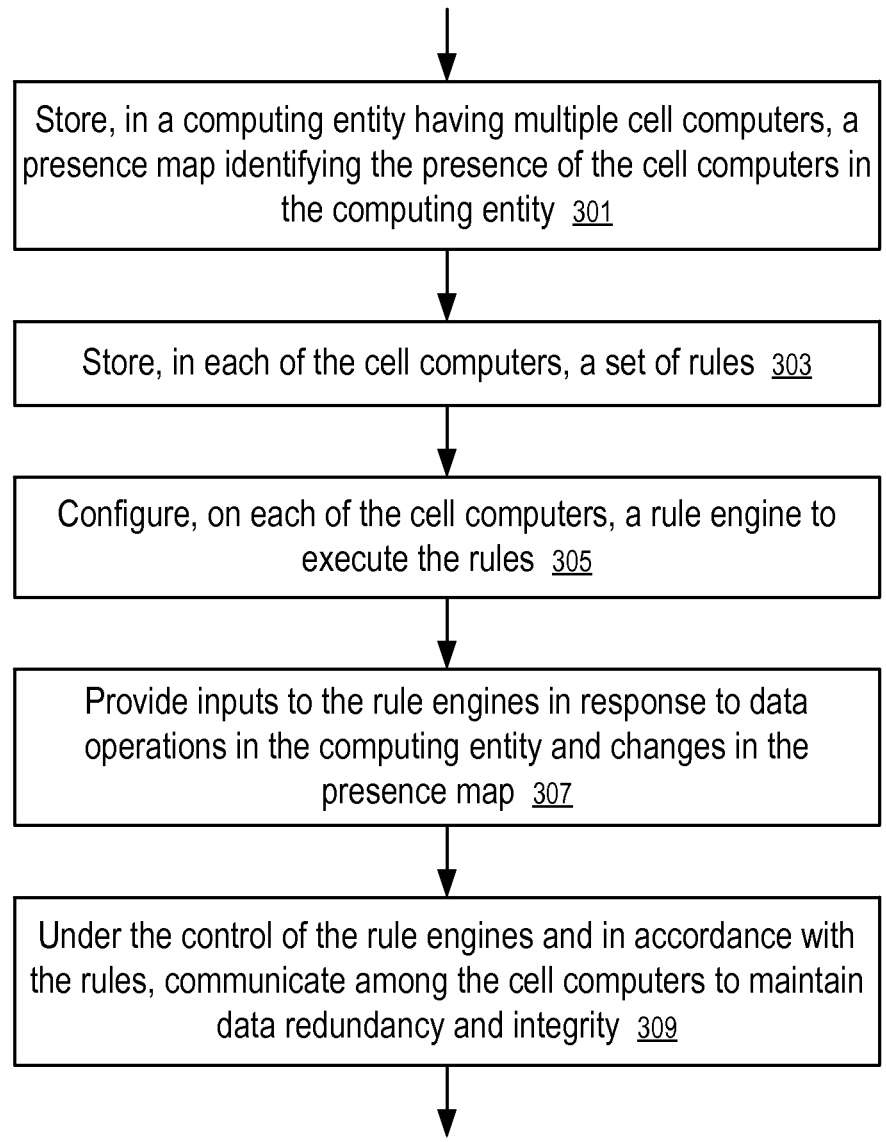
FIG. 10 shows a method to maintain data redundancy and integrity according to one embodiment.

FIG. 10 shows a method to maintain data redundancy and integrity according to one embodiment. In FIG. 10, a computing entity (107) having multiple cell computers (101) stores (301) a presence map (125) identifying the presence of the cell computers (101) in the computing entity (107). Each of the cell computers (101) stores (303) a set of rules and is configured (305) with a rule engine to execute the rules.

In FIG. 10, the cell computers (101) provide (307) inputs to the rule engines in response to data operations in the computing entity (107) and changes in the presence map (125). Under the control of the rule engines in accordance with the rules the cell computers (101) communicate (309) with each other to maintain data redundancy and integrity.

FIG. 11 shows a method to process removal of a computer from a computing system having stored files with redundancy according to one embodiment.

In FIG. 11, after detecting (311) the absence of a cell computer (101) from a computing entity (107), the rule engines of the remaining cell computers (101) in the computing entity (107) cause the remaining cell computers (101) to propagate (313) information about the absence of the cell computer (101) in the computing entity (107) to update the presence map (125) of remaining cell computers (101) in the computing entity (107); identify (315) files in the computing entity (107) that have portions previously stored on the cell computer (101); and communicate (317) among remaining cell computers (101) in the computing entity (107) to restore data redundancy for storing the files in the computing entity (107).

FIG. 12 shows a method to process the addition of a computer to a computing system having stored files with redundancy according to one embodiment.

In FIG. 12, after detecting (321) the presence of a new cell computer (101) added to computing entity (107), the rule engines of the cell computers (101) in the computing entity (107) propagate (323) information about the presence of the cell computer (101) in the computing entity (107), identify (325) files to be partially stored on the new cell computer (101), and communicate (327) among cell computers (101) in the computing entity (107) to generate portions of the files for storage on the new cell computer (101).

FIG. 13 shows a method to process a request to access a file stored in multiple computers of a computing system according to one embodiment.

In FIG. 13, after a cell computer (101) receives (331) a request to access a file stored in a computing entity (107) that has multiple cell computers (101), the cell computer (101) identifies (333) a plurality of cell computers (101) in the computing entity (107) that store portions of data for the file. The rule engine of the cell computer (101) directs the cell computer (101) to communicate (335) with the plurality of cell computers (101) to verify data integrity for the file and perform (337) data recovery in response to a failure in verifying data integrity for the file.

FIG. 14 shows a method to process a change in availability of computers in a computing system configured to store files with redundancy according to one embodiment.

In FIG. 14, after a cell computer (101) receives (341) a change in presence data of cell computers (101) in a computing entity (107), the rule engine of the cell computer (101) is configured to check the impact of the change.

For example, the rule engine identifies (343) a file stored in the cell computer (101) on which the rule engine is running and identifies (345) a plurality of cell computers (101), each assigned to store a portion of data for the file. The rule engine determines (347) whether the change in the presence data causes a change in identities of the plurality of cell computers (101) assigned to store data for the file, and if there is a change in the identities, the rule engine starts a process to update (349) the data for the file in the computing entity (107).

For example, prior to the change in the presence data, the presence map (125) as illustrated in FIG. 4 assigns a first set of cell computers (101) to store data for a given file. After the change in the presence data, there may or may not be changes to the assigning of the first set of cell computers (101) to store data for the file. If there is a change, the rule engine of the cell computer (101) may initiate a data recovery process to migrate the data from the first set of cell computers (101) to a second set of cell computers (101) computed from the updated presence map (125).

For example, after the change, the cell computer (101) may no longer be assigned to store any data for the file, and after a period of time from the re-storing of the file in the system, the rule engine may delete the data of the file from the cell computer (101).

For example, after the change in the presence map (125), the cell computer (101) may determine that the data storage assignment for one or more of the first set of cell computers (101) has been changed in view of the change in the presence map (125), and in response, the rule engine may communicate with the respective cell computers (101) to update the data stored therein.

For example, after the change in the presence map (125), the cell computer (101) may determine that a copy of data for the file is to be moved from one cell computer (101) to another, and the rule engine of the cell computer (101) is configured to communicate with the respective cell computers (101) to arrange the data transfer.

For example, after the change in the presence map (125), the cell computer (101) may determine that another cell computer (101) is now a new member of the cell computers (101) assigned to store a portion of the data for the file. The rule engine of the cell computer (101) may coordinate with rule engines of the cell computers (101) previously assigned to store the file to retrieve a copy of the file, and communicate the file to the new member, which can independently process the file to store the required data in a way as the file is received from a user. Alternatively, the rule engines of the prior members of the group of cell computers (101) assigned with each other may identify an optimally efficient way to retrieve and/or compute the data to be stored in the new member.

Figure 15:
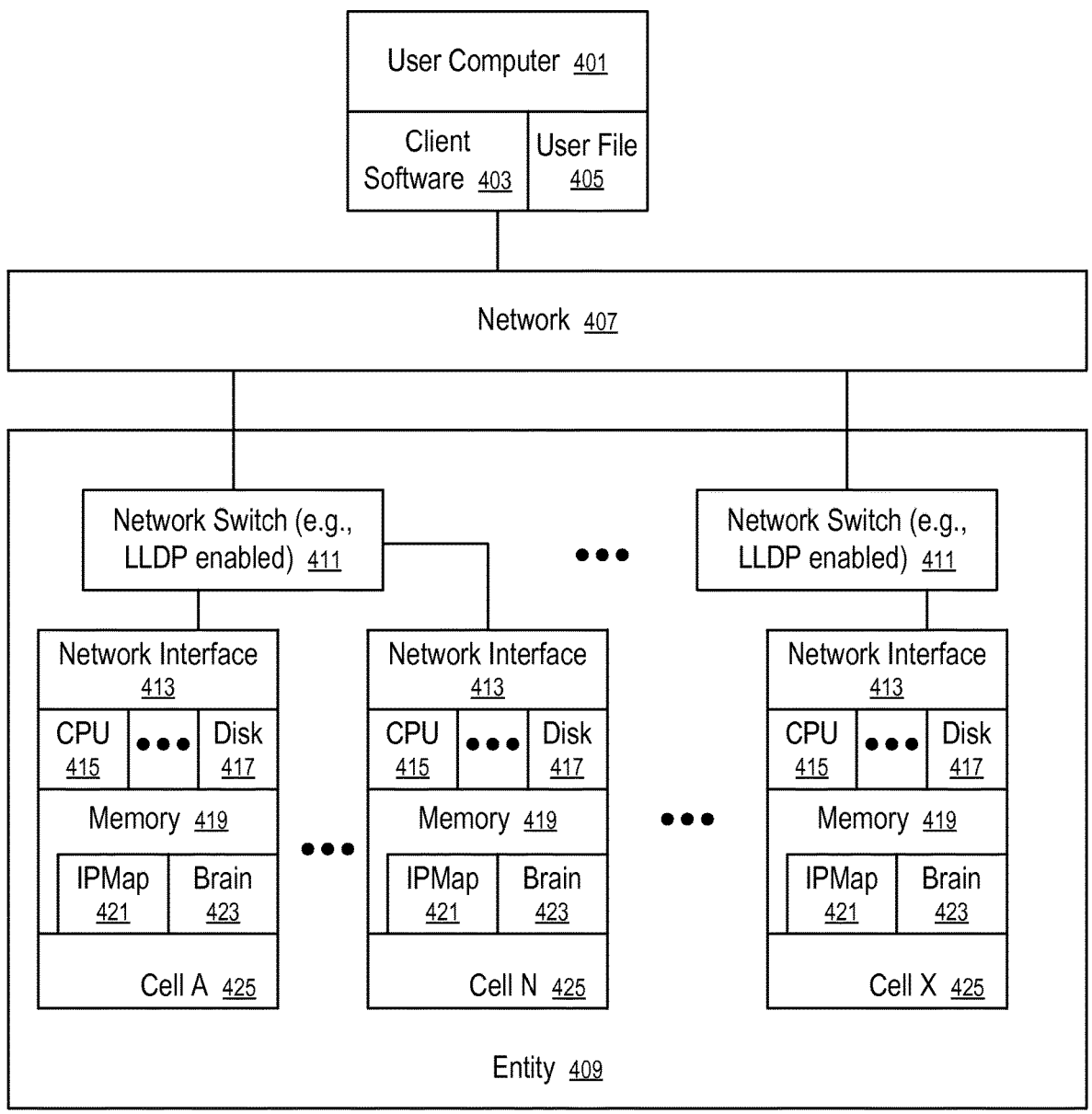
FIG. 15 shows a system to configure data storage according to one embodiment.

FIG. 15 shows a system to configure data storage according to one embodiment.

For example, the social cloud as illustrated in FIG. 15 has a set of cells (425) (e.g., cell computers (101)) that form one entity (409) (e.g., computing entity (107)) corresponding to a domain (e.g., cynny.com) in network.

In FIG. 15, each of the cells (425) has at least a CPU (415), a data storage disk (417), a memory (419) configured with software instructions and/or associated data (e.g., 421, 423), and a network interface (413).

In FIG. 15, each cell (425) is configured, via the software instructions, to determine an entity (409) to which it belongs, by determining the domain of the computer network (407) (e.g., cynny.com) in which it is physically connected to. The cell (425) may, for example, identify the domain via querying a network gateway, using a standard network protocol. Thus, based on the network configuration, a cell (425) attached to a network (407) can automatically configure itself to join the corresponding entity (409).

In FIG. 15, each cell (425) is configured to understand its role in the entity (409) by acquiring information from the network (407) it is connected to. For example, the cell (425) may use standard network protocol, such as LLDP (Link Layer Discovery Protocol), to determine the information about the first level network switch (411) to which it is connected and the neighborhood (e.g., other cells (425) connected to the same first level network switch (411)), the information about the second level network switch to which the first level network switch is connected and the neighborhood (e.g., other cells connected to the same second level network switch (411)), etc.

For example, in one embodiment, a cell (425) is connected to a first network switch (411) A that is in turn connected to a second network switch (411) B in a cascade configuration. Using LLDP protocol (or other protocols), the cell (425) is informed of the network configuration that the cell (425) is being connected to port-X on network switch (411) A and the network switch (411) A is connected to port-Y on network switch (411) B. Based on this network configuration information, the cell (425) determines its role in the entity (409).

For example, the cell (425) is configured to parse an LLDP query answer and determine the position of the cell (425) in the immediate network (407) (e.g., on port 2 of network switch (411) A). The cell then parses an LLDP query answer to determine the position of network switch (411) A (e.g., on port 24 of network switch (411) B). Based on the query results, the cell (425) uses a deterministic scheme to compute a role identifier (e.g., "24,2", based on the port 2 of network switch (411) A, and port 24 of network switch (411) B). The identifier (e.g., "24,2") may indicate whether the cell (425) has a role for storing metadata, a role for storing user data, or a role to perform computation services, etc. For example, in one embodiment, a predetermined rule may specify that identifiers corresponding to cells (425) having a position at port 2 of the first level network switches (411) are cells (425) having the role to store metadata, and thus identifiers of cells (425) having the pattern of "*,2" are cells (425) assigned the role of metadata cells (425).

In one embodiment, each cell (425) communicates with other cells (425) that are currently present on the network (407) to configure itself. Network analysis onboard software of a cell (425) assigns a role to the cell itself, indicating the services provided by the cell (425) in the entity (409), such as performing certain types of computations for the entity (409), providing certain data storage capacities for the entity (409), etc. The cell (425) joins the entity (409) to provide the services corresponding to the role, and the other cells (425) may be informed of the presence of the cell (425) in the entity (409) and adjust their operations to take advantage of the services offered by the cell (425).

In one embodiment, when a cell (425) joining the entity (409) fails to detect a minimal set of cells (425) in the neighborhood of the entity (409), the cell (425) assumes it has some problems and starts a diagnostic cycle.

In one embodiment, when a cell (425) wakes up in the network (407), the cell (425) configures itself to assume a role. For example, some of the cells (425) may be configured to store metadata of files (e.g., permissions, file types, sharing, redundancies), and other cells (425) may be configured to store the user data of the files (e.g., photo, video, etc.). When additional cells (425) are powered up to join the entity (409), the cells (425) communicate with each other to assign and/or update roles.

In some embodiments, a particular cell (425) of the entity (409) is configured to perform the computation for generating and/or updating the VIP map (e.g., presence map (125)) used by IPMap (421) software of all others cells (425) in the entity (409) and inject it into the entity (409). Alternatively, the cells (425) may assign roles via communications in a negotiation session. In one embodiment, a user interface is provided to allow a user to force configuration and/or manage the assignment of roles to the cells (425).

In one embodiment, each cell (425) has a map of a set of currently available cells (425) in the entity (409). The map may identify the cells (425) using the network configuration data (111). For example, a cell connected to port 2 of the first level network switch (411), which is in turn connected to port 24 of a second level network switch (411), may be identified based on the position identifier "24,2". A physical IP address (441) is assigned to the cell (425) on the basis of the network position identifier (443) "24,2". A given set of data to be stored can be mapped to a virtual IP address (437) through predetermined computing operations (e.g., the hashing examples provided below). A map is used to link virtual IP addresses (437) to the physical IP address (441), such that the given set of data to be stored can be first mapped to the virtual IP address (437) through the predetermined computing operations and then mapped to the physical IP address (441) using the map. This may be called VIP map (439) illustrated in FIG. 16.

In one embodiment, when a cell (425) joins the entity (409), it announces its presence in the network (407)/entity (409) (e.g., via LLDP). A push/pull policy or a DHT approach can be implemented in the cells (425) to cause all of the cells (425) in the entity (409) to obtain the updated VIP map (439). For example, after a cell A randomly chosen in the entity (409) is injected with a new VIP map (439), this cell A injects another cell Y with the same VIP map (439). The injection (push phase) terminates after a predetermined number of generations (e.g., 3 or 4). In a push/pull embodiment, periodically (e.g., every X seconds), each cell (425) is configured to ask one or more other cells (425) for updates about the VIP map (439) (pull phase). When enough cells have been injected with the new VIP map (439) during the push phase, the VIP map (439) can be propagated to call cells (425) rapidly in the pull phase.

As an alternative embodiment, a distributed hash table (DHT) approach can be used in place of the push/pull message exchange described above to update VIP map (439). For example, the VIP map (439) can be updated by using one of the implementations of a scalable peer-to-peer lookup service for internet applications, such as a Chord system documented by Ion Stoica et al., in "Chord: A scalable Peer-to-peer Lookup Service for Internet Applications", presented in SIGCOMM'01, Aug. 27-31, 2001, San Diego, Calif., USA, and published in IEEE/ACM Transactions on Networking, Vol. 11, Issue 1, Pages 17-32, February 2003. In such an embodiment, as soon as a cell (425) is added to the entity (409), the cell (425) is configured to take the ownership of a specific sub-set of data. A communication protocol, such as that used in the Chord system, can be used to update all of the others cells (425) in the entity (409) about the presence of the new arrived cell (425). In one embodiment, a CHORD module is implemented as a specific layer of software that is preloaded in the cell (425) and configured to update the VIP map using a scalable peer-to-peer lookup service for internet applications, as in the Chord system of Ion Stoica et al.

In one embodiment, an entity (409) (e.g., having a collection of cells (425) organized via network configuration under a domain name (113)) implements a file system, but it is not only a file system. An entity (409) may have worldwide cells (425) connected via one or more networks (407). Within the entity (409), cells (425) can be organized locally in regions (e.g., a group of cells (425) are in Europe, others in America). A globally extended entity (409) is configured to organize itself in order to let its users connect to the nearest cells (425) in order to allow efficient interaction with users.

In one embodiment, the entity (409) is global, as well as the file system implemented via the entity (409). In the file system, a single user file (405) may involve cells (425) in different world regions. For example, if a user wants to subscribe to disaster-recovery policy for his own data, the user may decide to implement a replication policy to store a copy of his files in different world-regions. When such a policy is used, the client software (403) (e.g., IPMap (421) discussed below) runs in the cell (425) and is configured to determine whether or not the cell (425) is to store the data of a user file (405) and is configured to cause cells (425) from different regions to store the file.

In FIG. 15, each of the cells has an IPMap (421) (e.g., client software (403)) that is configured to compute the locations for the storage of a user file. In one embodiment, which parts of a given user file (405) is stored in which cells (425) and/or at which locations are computed directly from the data of the user file (405) and a map of currently available cells (425) in the entity (409) (e.g., VIP map (439)).

Figure 16:
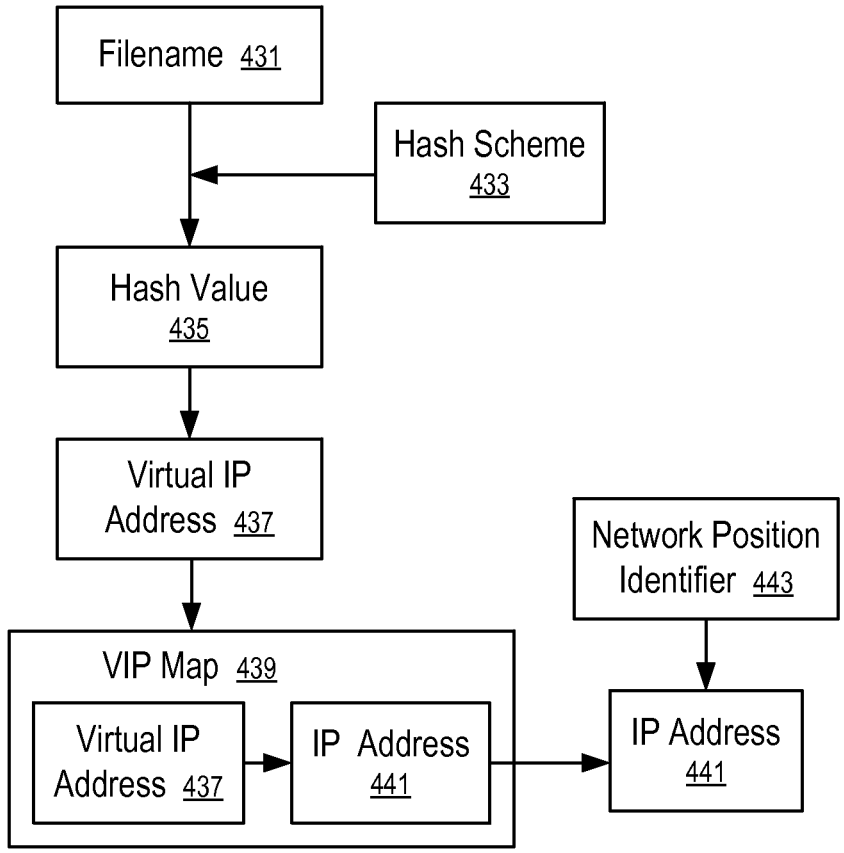
FIG. 16 illustrates a method to identify a computing device for the storage or processing of a portion of a file according to one embodiment.

For example, the filename (431) of the user file (405) can be hashed to generate a hash value (435) of a fixed length string using a hash scheme (433), as illustrated in FIG. 16. Different parts of the strings are used to identify different cells (425) for the storage of different portions of the user file (405), and parts of the string can be used to identify a directory and a local filename (431) in the file system of the cells (425) to store the respective portion of the user file (405). Thus, for a given filename (431), the IPMap (421) can deterministically compute which portion of the user file (405) is stored in which cell (425) and at which directory in the file system of the respective cell (425). In one embodiment, the IPMap (421) is computed based on the configuration of roles assigned to the cells (425) of the entity (409).

In one embodiment, a common file (e.g., virtual IP map (437)) shared by the cells (425) in the entity (409) is used to map a given part of the string to an IP address (441) of one of the cells (425) in a deterministic way.

For example, after the filename (431) of the user file (405) is hashed into a string, a first part of the string is mapped to identify a first cell (425) to store a first copy of the user file (405); a second part of the string is mapped to identify a second cell (425) to store a second copy of the user file (405); a third part of the string identifies a directory in the first and second cells (425) to store the first and second copies; and a fourth part of the string identifies a local filename (431) used to store the first and second copies in the directory, identified by the third part of the string, in the first and second cells (425). Thus, this example of the IPMap (421) implements the mirroring of a user file (405) stored within the entity (409).

In another example, the hash function may be applied recursively to obtain a sequence of hash values (435); and each of the hash values (435) in the sequence can be used to identify a cell (425). For example, the first hash value (435) in the sequence is used to identify the first cell (425) to store a first copy of the user file (405); the second hash value (435) in the sequence is used to identify a second cell (425) to store a second copy of the user file (405); the third hash value (435) in the sequence is used to identify a directory in the first and second cells (425) to store the first and second copies; and the fourth hash value (435) in the sequence is used to identify a local filename (431) used to store the first and second copies in the directory, identified by the third part of the string, in the first and second cells (425).

In one embodiment, the hash values (435) (or portions of the hash value (435)) of the filename (431) of the user file (405) are used to look up a cell (425) from the VIP map (439) in a deterministic way. For example, different ranges of the values from the string may correspond to different cells (425) identified in the VIP map (439). In some embodiments, the VIP map (439) include the information for mapping from string values (i.e. virtual IP address (437)) to the physical IP address (441) of the cells (425).

In FIG. 15, the client software (403) running on a user computer (401) broadcasts the user file (405) to the cells (425) of the entity (409), and the IPMap (421) executing in each of the cells (425) determines if any portion of the file is to be stored on the respective cell (425). If so, the location and/or the filename (431) in the local file system in the cell (425) storing the portion is computed. Alternatively, the cell (425) that has received the user file (405) uses the IPMap (421) to determine which cells (425) are responsible for storage of the user file (405) and communicate the user file (405) to the respective cells (425). Alternatively, one of the cells (425) (e.g., selected by the client software (403) or determined by the IPMap (421)) is configured to communicate with the client software (403) for further communicating to the user file (405) to the cells (425) responsible for storage of the user file (405).

In general, IPMap (421) can be implemented to store mirror copies for redundancy and/or parity-checking data for full data recovery. For example, an IPMap (421) may use a portion of the hash value (435) of the filename (431) of the user file (405) (or a hash value (435) in the sequences of recursively computed hashes) to identify a cell (425) to compute and store parity data. Thus, different levels of redundancy and/or parity-checking schemes can be implemented by distribution of the data to the responsible cells (425) in the entity (409) via IPMap (421).

In one embodiment, the IPMap (421) is configured to map a set of predetermined operations for storing a user file (405) to a subset of cells (425) within the entity (409). In general, the IPMap (421) can be configured to map a set of computer operations (e.g., computation and/or data storage) to a set of cells (425) within the entity.

In FIG. 15, each of the cells (425) of the entity (409) has a Brain (423) (e.g., software) running to maintain data integrity. When reading/writing a user file (405), a cell (425) responsible for the user file (405) communicates with other cells (425) that are also responsible for the user file (405) for the monitoring of the state of the user file (405) stored in the entity (409) with the desired level of redundancy/parity-checking. For example, if a cell (425) is found not available anymore in the entity (409) (e.g., when the cell (425) is dead, or offline for a time period longer than a threshold), the VIP map (439) of the remaining cells (425) are updated to allow IPMaps (421) of the cells (425) to map out the new locations of the files that were previously stored in the dead cell (425) and copying available files to new locations. In one embodiment, Brain (423) is implemented via a rule engine, and a set of data integrity rules and disaster recovery policies are implemented using the rule engine.

For example, when a cell (425) dies or is removed from the network (407), a cell (425) detects the absence of the dead/removed cell (425) using a Brain (423) and in response injects into other cells (425) a new VIP map (439), where the hash values (435) previously assigned to the absent cell (425) are re-assigned to others. Thus, the responsibilities of the services provided by the absent cell (425) are distributed to the remaining cells (425). After the new VIP map (439) is propagated to the cells (425) in the entity (409), the Brain (423) of each cell (425) starts to recover data from still alive redundancy copies or on the basis of error correcting algorithms.

For example, when a new cell (425) is added to the entity (409), the existing VIP map (439) is modified to assign a set of hash values (435) to the cell (425) to generate a new VIP map (439). After the new VIP map (439) is propagated in the entity (409) and the new cell (425) obtains the data from the other cells (425), relevant cells (425) under the control of the Brain (423) that are no longer responsible for certain VIP maps (439) may start deleting respective data from their disks (417), which they will no longer be asked to provide (i.e., data related to VIP maps (439) they will not serve anymore).

The hardware architecture disclosed herein radically changes the point of view about the issues related to the maintenance and expansion of the storage systems.

A storage entity (409) of one embodiment includes a large and variable group of cell (425) servers that can be very little, ideally composed by a CPU (415) and a disk (417). For example, the number of CPUs (415) and the number of disks (417) deployed in the storage entity (409) can be quite the same.

Adding a CPU (415) or a disk (417) is as simple as connecting an Ethernet cable, and does not imply any stop or degradation of service.

No maintenance operations are required, and new cells (425) can simply be added to the network (407) to replace the dead ones.

The storage space (that is theoretically infinite) is addressed by a deterministic mathematical algorithm (hashed bases), that allows all saved data to be retrieved by reversing the same algorithm. This avoids the use of an index as happens in traditional approaches.

Via the use of IPMap (421) software and VIP maps (439), the algorithm can uniformly spread data on a series of independent storage cells (425), each one of which owns just a small part of the information stored on the system. This also means that by adding new cells (425), the system of the entity (409) can be expanded indefinitely.

When a new cell (425) is added to the entity (409), it automatically connects to the others, and autonomously takes its role in the system.

Via the use of IPMap (421) software and VIP maps (439), information is spread into the cells (425) following a redundancy policy, so that losing a restricted number of cells (425) doesn't compromise data availability.

When existing cells (425) are no longer able to offer services in the entity (409) with sufficient performances, new cells (425) can be added to the entity (409) by simply connecting them to the network (407). This grants that the level of information redundancy is continuously maintained over time.

In the storage system of the present disclosure, performance increases for every new cell (425) added. That happens because the load of disk I/O operations performed by the whole system spreads on a greater number of independent storage/computational units. The cells (425) operate in a way substantially independently from each other in providing the services.

In a traditional storage system, the addition of new space generally slows down the performance, as the computational power and bandwidth remains unchanged.

Figure 17:
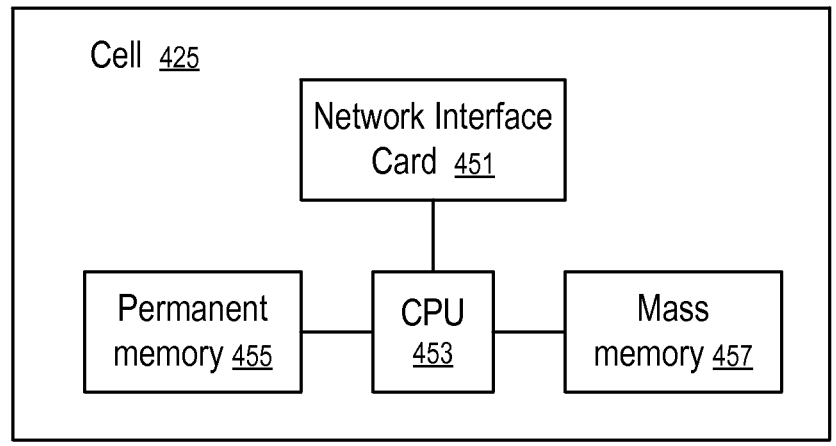
FIG. 17 illustrates a computer that can be used in a computing system according to one embodiment.

In one embodiment, the hardware of the storage system is composed by a set of basic units, each being a microserver or cell (425) as illustrated in FIG. 17.

In FIG. 17, a microserver/cell (425) includes a CPU (453), a network interface card (451) and a permanent memory (455) to store the system and the software service. Moreover, each microserver/cell (425) has a mass memory (457) to store data received from users (in case the server is using a storage unit).

Using the network (407), cells (425) in the storage system across the world can communicate with each other for the purpose of sharing and synchronizing data. Thus, a set of self-organized cells (425) can form a storage system in the form of a computing/storage entity (409).

In one embodiment, a cell (425) is added to the entity (409) by connecting to its computer network (407) without information about its position and role in the entity (409). It means that the cell (425) doesn't know which other cells (425) it has as neighbors, and it doesn't know if it has to store data or just provide computational service.

After the cell (425) is connected to the network (407), it gets information/instructions about the entity (409), by communicating with other cells (425) and/or the network (407) infrastructure (e.g., network switches (411), gateways). The information can be obtained by using standard network protocol, such as LLDP (Link Layer Discovery Protocol).

In some embodiments, dedicated configuration files may be used. Such files can be initially injected, for example, but they change over time in accordance with the health-status of the entity (409) and the presence of the member cells (425) of the entity (409).

In one embodiment, after a new cell (425) is connected to the computer network (407), the cells (425) in the entity (409) communicate with each other to reorganize the entity (409) to utilize the services of the new cell (425) and adapt to the level of services the entity (409) can provide.

In one embodiment, the new cell (425) does not have a preloaded MacAddress and/or a preloaded IP address (441) in relation with Ethernet network or TCP/IP protocol. These parameters are assigned to the cell (425) based on the physical location of the cell (425) connected in the computing network (407) (e.g., in term of hierarchy of ports and/or network switches (411)/gateways it is connected to).

For example, when a cell (425) joins an entity (409), it asks others about colocation. On the basis of the colocation information, it assumes a role in the entity (409). A software component, IPMap (421), is configured to combine physical IP addressing (441) and role assignment.

In one embodiment, the logical role of a cell (425) is assigned on the basis of the physical IP address (441). The cell (425) is implicitly responsible for a portion of data stored in the entity (409) or of a portion of a computational set of operations.

For example, a mapping between roles and positioning information can be used to implement the role assignment. After a cell (425) assigns itself a physical address (MacAddress and IP address (441)) on the basis of the switch (411) ports to which it is connected (e.g., identified via LLDP) by reading the mapping between positioning and roles, it understands the roles it has in the entity (409).

The above arrangement implies that a cell (425) can easily substitute for another cell (425). When a cell (425) is physically being replaced with another cell (425) at the same physical position in the network (407) connection structure, the replacement cell (425) will acquire the same MacAddress, the same IP address (441), and the same role of the cell (425) being replaced.

The cell (425) can also be replaced logically by having a replacement cell (425) placed in a different physical position in the network (407) connection structure, but assigned the same role.

In one embodiment, the entity (409) as a whole will inform the cell (425) about information it needs to absolve its role and where to get the data it is still missing. Data (also from the dead cell (425)) is always available in the network (407) as a consequence of redundancies and error-correcting policies.

Cells (425) may be set as dormant. For example, after a cell (425) obtains an IP address (441) in the computer network (407), if it is not assigned a role, it is dormant in the entity (409) until the entity (409) is informed about the presence of the cell (425) and reorganizes itself to utilize the services of the cell (425).

In one embodiment, to set a cell (425) as dormant, it is enough to exclude its position from the mapping of roles. Putting it back again in the map causes the entity (409) to start to use it again.

In one embodiment, IPMap (421) is a software component that assigns a portion of the data or computational-role to a cell (425) that has a physical IP address (441). It can be obtained by several implementation techniques, or by a mix of: Hashmaps, BTree/BTree*, and Indexer techniques in general. IPMap (421) takes identification as input data (i.e., bytes) and provides as output the identification of at least one cell (425) and/or one location on the cell (425) where the data (or a portion of the data) is to be stored.

In one embodiment, the Brain (423) is the software component that monitors data availability and cell (425) activity. Each cell (425) contains a Brain (423) that can take instant decisions in order to correct data. Decisions are taken on the basis of instant information eventually provided by several cells (425).

The Brain (423) can act permanently or transparently on data it decides to correct. It basically implements correction on the basis of a parity-check/redundancy policy.

Common RAID5/RAID6 Disk-Array devices may implement a technique for parity-check/redundancy. However, in the storage system in the present application, the redundancy/parity-check sets are not required to be stored on a fixed set of disks (417) (e.g., array). This change very much improves the reliability of the system as data reliability is independent from the reliability of the single piece of hardware.

In one embodiment, a computing/storage entity (409) is a set of microservers (cells (425)) listed on the VIP map (439). It can be implemented, for example, as one or more racks of microservers (cells (425)).

Each cell (425) implements a software that lets it autonomously assume a role in the rack hierarchy by, for example, taking charge of a predetermined set of data and, at the same time using the same software, assures to avoid service degrading even when other cells (425) in the entity (409) can malfunction, without degrading the services provided to users by the entity (409).

A simple example of rack hierarchy may implement following roles:

Metadata cells (425): cells (425) that contain information about permissions, file types, sharing, redundancies, etc.; and Data Cells (425): cells (425) that contain data (Photo, Video etc.).

When the entity (409) is asked to access a stored file, the entity (409) accesses the metadata information to determine whether the user can access the data of the stored file.

Example implementation: an entity (409) is implemented as a rack of cells (425). The rack is composed of network apparatus (switches (411)), and several chassis of storage cells (425). Each of these apparatus can fail for a variety of reasons. To reduce the risk of having lack of services to the users, inside each cell (425) there is an implementation of two dedicated software programs: IPMap (421) and Brain (423). IPMap (421) gives a role to a cell (425); and Brain (423) implements error-detecting and/or error-correcting policies. In some embodiments, also a CHORD module is inserted under the IPMap module to provide a standard approach in the detecting of cell-entity hierarchy.

IPMap (421) can be implemented in a form of HashMap. For example, when the user uploads a file, the file is univocally associated with a group of cells (425), and the data bytes of the file are stored on the hard disk drives (417) attached to a deterministic group of cells (425) in a unique way.

For example, in one example implementation, Md5 is applied to the filename of the user file (e.g., File.bmp) to obtain the hash value (435) (e.g., 4a586cf87b342878153dc3c81d76fccb).

Md5(File.bmp)=4a586cf87b342878153dc3c81d76fccb

The first n bytes of the hash value (435) are traduced into an IP address (441) by using a mapping stored on a common file. The cell (425) having the IP address (441) is to store a first copy of the data of the user file (405).

Bytes n+1 to m of the hash value (435) are used to individuate a second IP address (441), and the cell (425) having the second IP address (441) is to store a second copy of the data of the user file (405).

Bytes m+1 to p of the hash value (435) are used to identify a directory in the file system of the mass memory (457) of the microserver (cell (425)) for storing a copy of the data of the user file (405).

Bytes p+1 to q of the hash value (435) are used to identify the name by which the file is stored in the file system of the mass memory (457) of the microserver (cell (425)).

Note that the use of the simple scheme illustrated above based on Md5 may have a lot of collisions (e.g., different files being mapped to the same storage location). A smart system can be implemented to avoid/resolve the collisions and/or reduce the chance of collisions.

Building upon the example, the hash approach can be used to identify more than two IP addresses (441) for storing more than two copies of the file, and/or store an error-correcting copy, which is stored on one of the cells (425) identified by the IP addresses (441) determined from the hash value (435).

In embodiments where a CHORD module is used, one or more keys can be generated using an MD5-based approach. However the keys generated using the MD5 hashing function is not directly mapped to a virtual IP. The CHORD module is used to recover the competent IP, by querying the entity using the communication protocol for the peer-to-peer lookup service implemented in the CHORD module. A map of Virtual-IP vs Real-IP is still used, but on a dynamic basis. The map can be meant as static for very long periods but also able to update itself in case of faults or new entries, without any impact on the clients which have the guarantee to receive for each key the VIP of the node that is in charge of it.

Using this approach, when a cell (425) dies the system can tolerate the loss of the cell (425). The Brain (423) running in the remaining cells (425) of the system detects the loss of the cell (425) and can reorganize to operate involving another cell (425) to replace the function of the lost cell (425).

All of the data of the user file (405), stored in the group of the survived cells (425) that contains a copy of the same file, are still available. The Brain (423) of any cell (425) can move this data from the survived cell (425) to the new cell (425) that joins the group after the reorganization.

In one embodiment, each cell (425) is reachable by an opportunely designed client. For example, the client sends messages to a cell (425). The message contains, basically, data about the user file (405) to store.

IPMap (421) that resides in the cells (425) computes where in the entity (409) the file is to be stored.

The message contains information about redundancy copies and extended parity copies. Redundancy copies and parities allow tolerating and masking faults to the final user.

Moreover, while performing writing/reading iteration, a cell (425) collects instant knowledge about:

number of copies available for a replicated data;
number of parity elements available for each set of parity corrected data;
success in writing to another cell (425);
success in reading from another cell (425);
success in connecting to another cell (425); and/or
success in reaching another cell (425).

These indicators are commonly available while reading/writing data. If something goes wrong (and some alert thresholds are reached), the Brain (423) starts an analysis routine in order to take a decision about correcting or tolerating the problem.

The availability of such information allows implementation of real time error-detection policy.

On the basis of the error detected, error-correcting policies can be activated.

A set of a priori rules is currently cabled in the Brain (423) software:

While checking the redundancies/parity policies if some copies (same version) are damaged, the Brain (423) takes charge to replace the lost copies;
Ipmap(file)=adrr_copy1, addr_copy2, . . . , addr_copy3;
For each copy in
adrr_copy1, addr_copy2, . . . , addr_copy3;
Do:
if copy is damaged
read next(copy) and replace(copy);
Done;
While connecting/reaching a cell (425), if problems are revealed a diagnostic routine is launched in order to identify the fault width.

If it is a reaching problem the Brain (423) tries to reach the cell (425) by using an alternative path.

Cells (425) are provided of more network interface card (451): cell.a, cell.b etc.
If Connect(cell.A)==false
Then: Connect(cell.B)
If it is a connecting problem (cell (425) is reachable but doesn't respond) a repairing policy is activated.
If Connect(cell.A)==true
Then: If (SendData(cell.A, copy)==false and
SendData(cell.B, copy)==false)
Then:
// the copy is sent to another cell (425)
SendData(next(cell), copy)
If too much cells (425) are unavailable the entity-service is suspended.
For each cell (425) in Rack
Do:
If (Connect(cell.A)==false and
Connect(cell.B)==false)
N=N+1;
Done
If N>25% of Rack SuspendService( );
The Brain (423) can be implemented as a rules-engine. The set of rules can be easily expanded.

Figure 18:
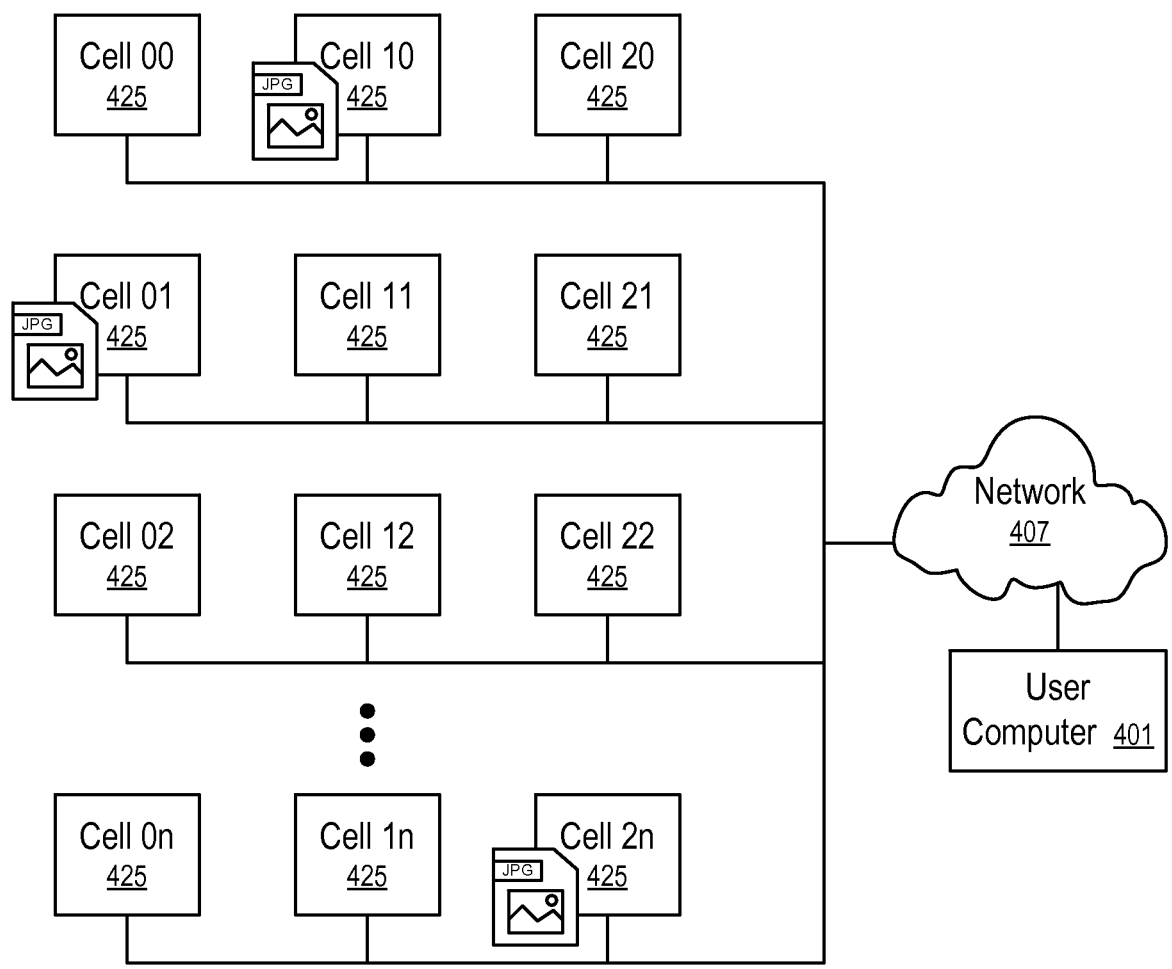
FIGS. 18-20 illustrate the life cycle of computers in a computing system according to one embodiment.
Figure 19:
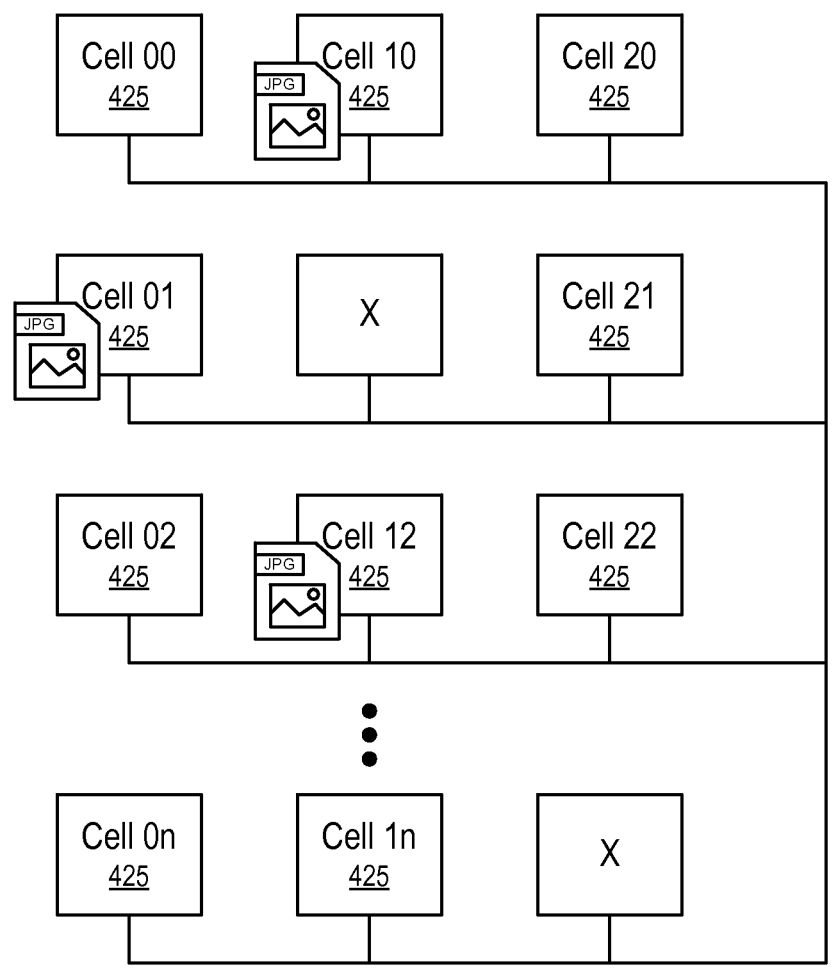
Figure 20:
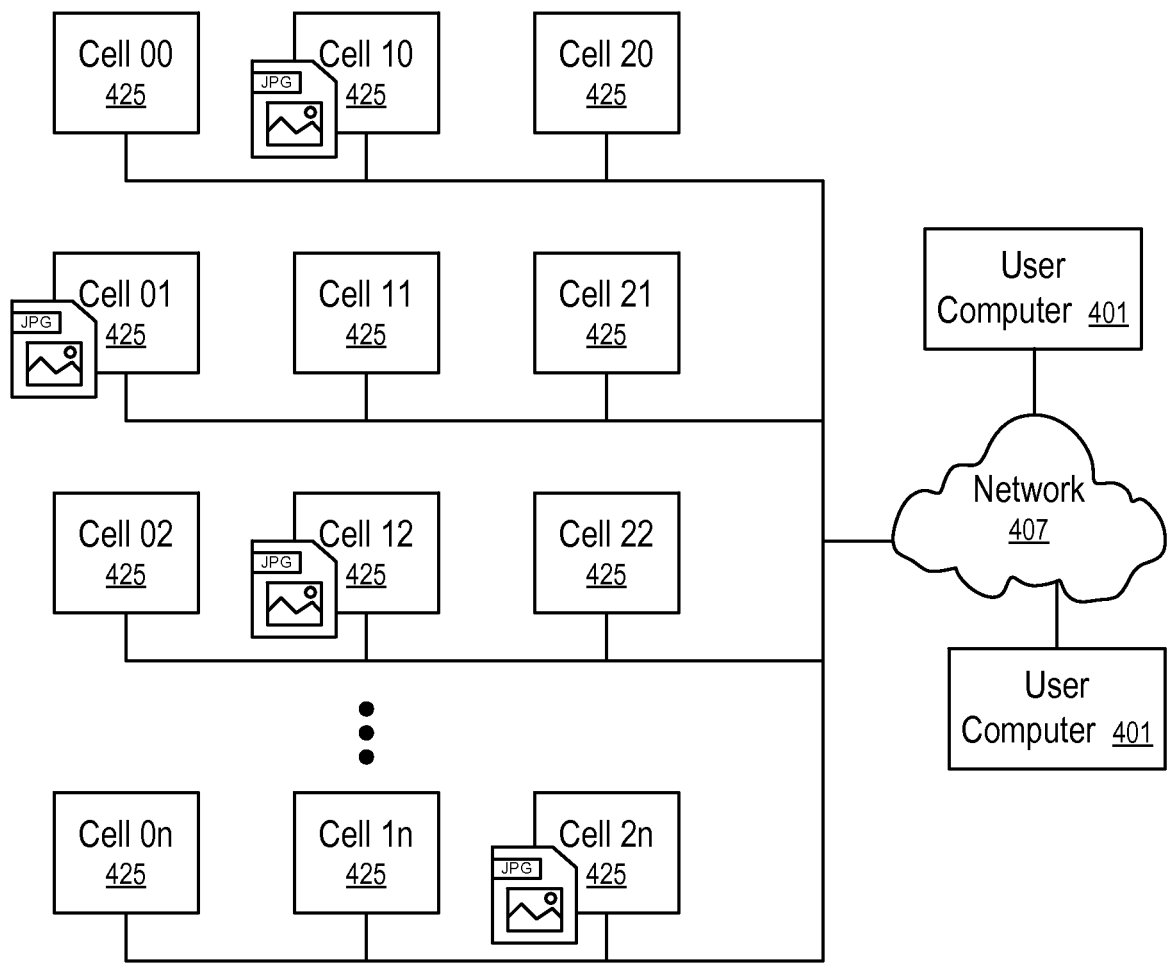

FIGS. 18-20 illustrate the life cycle of cells (425) in an entity (409) according to one embodiment.

In FIG. 18, an entity (409) of cells (425) is reached by a user. The user uploads document A onto the entity (409).

His document is rapidly copied to several cells (425) (e.g., Cell 10, Cell 10, Cell 2*n*)

After a cell (425) (e.g., Cell 2*n*) (or disk (427) connected to) is damaged, the Brain (423) detects the problem and copies data from still available cells (425) that contain it to another cell (425) (e.g., Cell 12) that is still responding, as illustrated in FIG. 19.

In one embodiment, there is no deterministic way to identify the cell (425) that will take charge of the recovered copy, so it can go on until the network (407) is reasonably wide.

After diagnostic/repairing action, the user is able to recover his document again without any lack of service.

This approach is better than the current RAID-based approach as explained further above.

The Brain (423) could also decide to postpone repairing, or to not correct the problem, based the rules configured for the Brain (423) running as a rule engine.

If failures were transitory (e.g., Network (407) problem) or a maintenance operation is performed to reactivate the lost cells (425)/disks (417), data is for a while over-redundant as illustrated in FIG. 20. Brain (423) running in one of the cells (425) of the entity (409) can now decide to remove old-copies in order to maintain reasonably low usage of the disk (417) space in the entity (409).

In one embodiment, a technology is provided to implement a storage system for electronic data, which is virtually and endlessly expandable in terms of performance and storage space. The system includes a set of microservers connected via a computer network to self-organize themselves for role assignment and data recovery. A mapping technique is used to distribute, across a subset of microservers, storage tasks and/or computation tasks for storing or retrieving a user file with data redundancy; and the subset is selected from the available microservers in the system in a deterministic way based on an identifier of the user file. The selection is configured to pseudo-randomly distribute the tasks associated with different files among the microservers in the system.

In one embodiment, a method to implement the storage system includes: providing a plurality of cell computing devices, where each respective cell computing device has a network interface, a data storage device, a processor, and memory storing instructions configured to operate the respective cell computing device.

When the network interface is connected to a computer network, the respective cell computing device is configured by the instructions (e.g., instructions of implementing communication protocols for a peer-to-peer lookup service, such as those in a CHORD module) to perform at least: identifying the plurality of cell computing devices that are currently connected to the computing network; communicating among the plurality of cell computing devices to maintain a mapping between a set of virtual addresses and the plurality of cell computing devices; receiving an identification of a dataset; computing a virtual address from the identification; determining whether the virtual address corresponds to the respective cell computing device based on the mapping; and in response to a determination that the virtual address corresponds to the cell computing device, storing or processing at least a portion of the dataset independent of other cell computing devices on the computer network.

In one embodiment, in response to detecting a change in cell computing devices presented on the computer network, the cell computing devices currently presented on the computer network communicate with each other to update the mapping between the set of virtual addresses and the cell computing devices currently presented on the computer network.

In one embodiment, in response to detecting absence of a cell computing device previously in the mapping, the cell computing devices automatically perform data recovery operations according to a set of rules based on updating the mapping.

In one embodiment, a non-transitory computer storage medium stores the instructions configured to instruct the cell computing devices to perform operations of various embodiments discussed above.

In one embodiment, a respective cell computing device is configured with instructions to perform operations of various embodiments discussed above.

In one embodiment, a computing system includes a plurality of cell computing devices connected to the computer network and configured with instructions to perform operations of various embodiments discussed above.

In one embodiment, the memory (419) of a cell (425) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing device, comprising:
a network interface configured to be coupled with a computer network having a plurality of cell computers of a computing entity;
at least one microprocessor; and
a memory storing instructions configured to instruct the at least one microprocessor to:
store, in the computing device configured as a cell computer in the computing entity, a list of identities of the cell computers that are currently available on the computer network to perform computing tasks on behalf of the computing entity;
receive, via the network interface, a computing request directed to the computing entity that is configured to use multiple cell computers to perform multiple pre-determined portions of operations associated with the computing request;
determine, independent of other cell computers in the computing entity, a plurality of identities of the cell computers in the list of identities by recursively applying a hash algorithm to a portion of the computing request to yield strings, and mapping a plurality of portions of the strings to compute multiple identities of different cell computers in the computing entity for the multiple pre-determined portions of the operations;
determine whether any of the multiple identities corresponds to the computing device configured as a cell computer in the computing entity; and
in response to a determination that one of the multiple identities corresponds to the computing device, perform one of the multiple pre-determined portions of operations associated with the computing request.

2. The computing device of claim 1, wherein
the request includes a file to be stored in the computing entity;
the multiple identities are mapped from a hash of a filename of the file; and
the multiple pre-determined portions of operations include storing portions of the file with redundancy.

* * * * *